(12) United States Patent
Richards et al.

(10) Patent No.: US 10,214,219 B2
(45) Date of Patent: Feb. 26, 2019

(54) METHODS AND SYSTEMS FOR POWERTRAIN NVH CONTROL IN A VEHICLE

(71) Applicant: Ford Global Technologies, LLC, Dearborn, MI (US)

(72) Inventors: Adam J. Richards, Canton, MI (US); Adam Nathan Banker, Canton, MI (US); Amey Y. Karnik, Canton, MI (US); John Eric Rollinger, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/403,010

(22) Filed: Jan. 10, 2017

(65) Prior Publication Data

US 2018/0194356 A1  Jul. 12, 2018

(51) Int. Cl.
| | | |
|---|---|---|
| *F02D 29/02* | (2006.01) | |
| *F02D 37/02* | (2006.01) | |
| *B60W 30/20* | (2006.01) | |
| *B64G 1/24* | (2006.01) | |
| *B60W 10/02* | (2006.01) | |
| *B60W 10/06* | (2006.01) | |
| *B60W 10/11* | (2012.01) | |
| *F02D 17/02* | (2006.01) | |
| *F02D 41/00* | (2006.01) | |

(Continued)

(52) U.S. Cl.
CPC .......... *B60W 30/20* (2013.01); *B60W 10/026* (2013.01); *B60W 10/06* (2013.01); *B60W 10/11* (2013.01); *F02D 17/02* (2013.01); *F02D 29/02* (2013.01); *F02D 37/02* (2013.01); *F02D 41/005* (2013.01); *F02D 41/0087* (2013.01); *F02P 5/145* (2013.01); *B60W 2520/105* (2013.01); *B60W 2710/025* (2013.01); *B60W 2710/0627* (2013.01); *B60W 2710/0633* (2013.01); *B60W 2710/1005* (2013.01); *B60Y 2306/09* (2013.01); *F02D 41/0215* (2013.01); *F02D 41/123* (2013.01); *F02D 2200/025* (2013.01); *F02D 2200/101* (2013.01); *F02D 2200/50* (2013.01)

(58) Field of Classification Search
CPC .... B60W 10/026; B60W 10/06; B60W 10/11; B60W 2520/105; B60W 2710/025; B60W 2710/0627; B60W 2710/0633; B60W 2710/1005; F02D 17/02; F02D 41/005; F02D 41/123; F02D 41/26; F02D 2200/101; F02P 5/145; B60Y 2306/09
See application file for complete search history.

(56) References Cited

U.S. PATENT DOCUMENTS

| | | | |
|---|---|---|---|
| 7,785,230 B2 * | 8/2010 | Gibson | B60W 30/20 477/101 |
| 9,308,891 B2 | 4/2016 | Cudak et al. | |

(Continued)

*Primary Examiner* — Jacob S. Scott
*Assistant Examiner* — Tinh Dang
(74) *Attorney, Agent, or Firm* — Julia Voutyras; McCoy Russell LLP

(57) ABSTRACT

Methods and systems are provided for adjusting noise, vibration, and harshness (NVH) limits for a vehicle based on a number of occupants in the vehicle. In one example, a method may include responsive to detecting zero occupants, reducing NVH constraints for operating the vehicle and adjusting one or more vehicle operating parameters based on the reduced NVH constraints.

18 Claims, 13 Drawing Sheets

(51) Int. Cl.
    *F02D 41/12*     (2006.01)
    *F02D 41/26*     (2006.01)
    *F02P 5/145*     (2006.01)
    *F02D 41/02*     (2006.01)

(56) References Cited

U.S. PATENT DOCUMENTS

| | | | |
|---|---|---|---|
| 9,786,181 B2* | 10/2017 | Jo | G08G 1/202 |
| 2007/0215101 A1* | 9/2007 | Russell | F02P 15/02 |
| | | | 123/310 |
| 2009/0325764 A1* | 12/2009 | Surnilla | B60W 10/06 |
| | | | 477/115 |
| 2012/0271500 A1 | 10/2012 | Tsimhoni et al. | |
| 2013/0297191 A1* | 11/2013 | Gibson | F02N 11/0855 |
| | | | 701/112 |
| 2015/0149023 A1 | 5/2015 | Attard et al. | |
| 2016/0116293 A1* | 4/2016 | Grover | G01C 21/34 |
| | | | 701/23 |
| 2016/0328976 A1* | 11/2016 | Jo | F02D 41/403 |
| 2018/0046184 A1* | 2/2018 | Subramanian | G05D 1/0061 |

* cited by examiner

Torque converter operation

METHODS AND SYSTEMS FOR POWERTRAIN NVH CONTROL IN A VEHICLE

FIELD

The present description relates generally to methods and systems for controlling a vehicle engine during an autonomous mode of operation.

BACKGROUND/SUMMARY

Noise, Vibration, and Harshness (NVH) behavior of a vehicle is significantly influenced by the vehicle's powertrain. For example, NVH may result from vibration due to combustion quality issues, torque converter operation, and variable displacement cylinder switching. For example, cylinder deactivation causes lower frequency and higher amplitude torque vibrations at the crankshaft. These vibrations can be transmitted through components such as seats, steering wheel etc., to the vehicle occupants, thereby generating undesirable noise within the vehicle cabin. Further, transmissions experience noises such as gear meshing noise and pump noise. Furthermore, gasoline engines experience noise from sources such as direct-injection fuel systems. Example methods to control NVH include coordinately controlling the noise through electronically controlled devices to provide smooth consistent operation. In some examples, in order to improve NVH, engine-operating modes, such as variable displacement, are limited to certain engine operating regions, such as mid-range engine speeds at low or moderate loads.

However, the inventors have recognized that the methods that limit NVH also have a negative impact on fuel economy. In other words, when NVH constraints are imposed, fuel economy improvement is reduced. As a result, there is a trade-off between NVH and fuel economy, and the NVH limit becomes the limit for fuel economy improvement that a given technology can provide. For example, as described previously, operating range of fuel saving technologies, such as VDE, is limited due to NVH constraints. Consequently, the fuel economy improvement that can be achieved with it is also reduced. Further, it is assumed that an occupant will be in the vehicle 100% of the time the vehicle is moving, and thus, the NVH limit for a given operation is set and does not change during the life cycle of the vehicle.

Furthermore, the inventors have recognized that in vehicles with autonomous capabilities, the assumption that an occupant will be in the vehicle does not hold. For example, the vehicle may be operated in an autonomous mode without any occupant between passenger pick-up locations or while transferring goods. When no occupants are present, the active controls to limit NVH severely impact fuel economy without actually providing driver comfort. For example, NVH related constraints depend on human perception (e.g., through seat, steering, pedal, and audible perception for a driver; through seat and audible perception for a passenger). These constraints are no longer applicable in the absence of occupants; yet, the NVH constraints affect fuel economy improvement.

In one example, the issues described above may be addressed by a method for operating a vehicle, comprising: during an autonomous mode of vehicle operation, altering noise, vibration, and harshness (NVH) limits for a powertrain of the vehicle responsive to detecting zero occupants within the vehicle to improve fuel economy. In this way, drivability may be compromised when zero occupants are detected within the vehicle in order to improve fuel economy.

As one example, when a vehicle is operating in autonomous mode, if zero occupants are detected within the vehicle, NVH constraints limiting fuel economy for a given technology may be relaxed in order to improve fuel economy. For example, with reduced NVH constraints, operating range of one or more of variable displacement operation, deceleration fuel shut off, exhaust gas recirculation, may be expanded to provide greater fuel economy improvement while compromising NVH. Further, torque converter slip may be adjusted towards less slip to improve fuel economy by reducing torque loss. Furthermore, transmission shift schedule may be adjusted for improved fuel economy. As a result, the vehicle will improve fuel economy at the expense of NVH. However, the NVH will not drive customer complaints through interaction, as there are no occupants in the vehicle. In this way, by setting different NVH limits or constraints based on whether an occupant is present or not, fuel saving technologies, such as variable displacement operation, DFSO, etc., may be maximized for fuel economy improvement.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
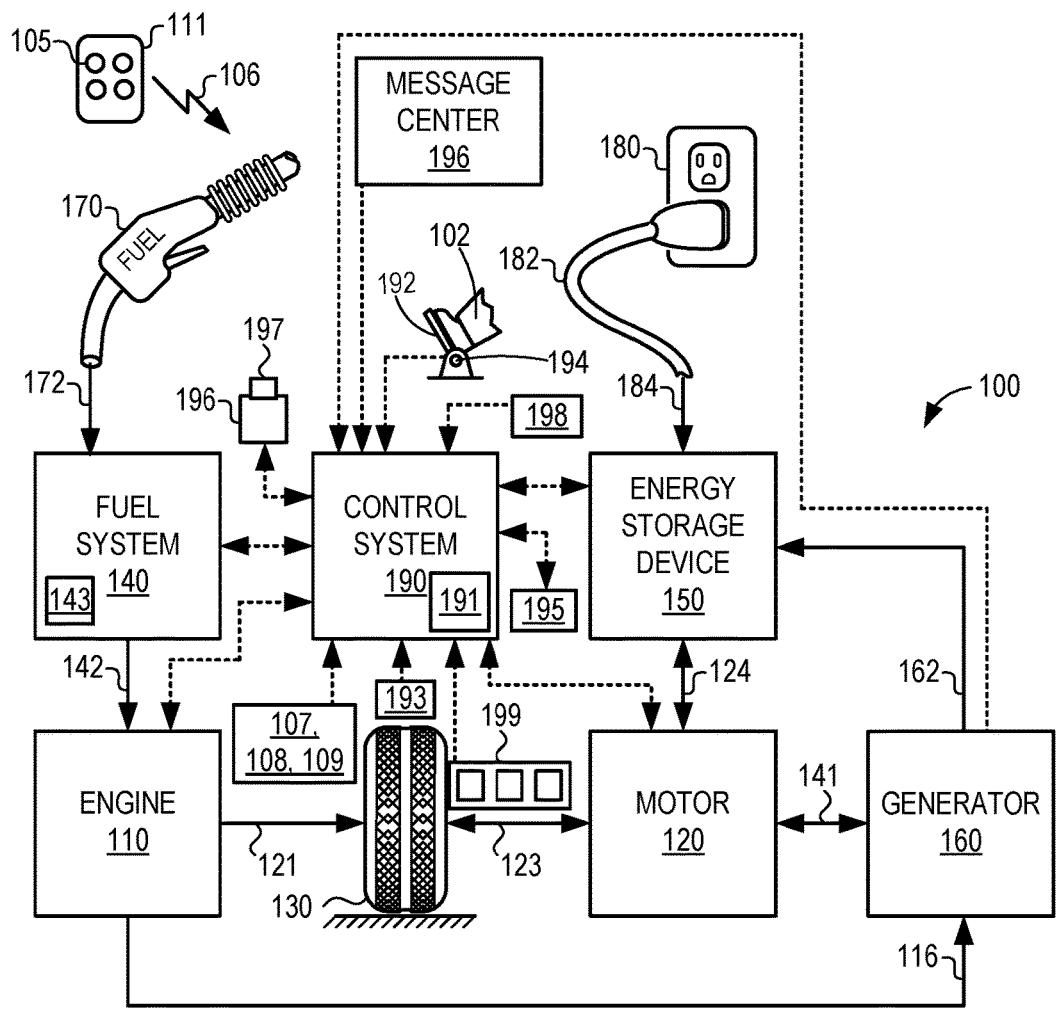
FIG. 1A illustrates an example vehicle propulsion system.

The following description relates to systems and methods for adjusting vehicle operation to alter a balance between fuel economy and noise, vibration, and harshness (NVH) of a vehicle, such as the vehicle shown in FIG. 1A, based on a number of occupants within the vehicle. The vehicle may be configured to operate in one of an operator controlled mode, a semi-autonomous mode, or an autonomous mode. Further, the vehicle may include an occupant sensing system for detecting when zero occupants are present in the vehicle. Responsive to detecting zero occupants in the vehicle, vehicle operation may be adjusted to increase fuel economy improvement while compromising NVH. Adjusting vehicle operation may include adjusting operation of one or more electronically controlled devices in a driveline of the vehicle, such as the driveline shown in FIG. 2. Further, adjusting operation of the vehicle driveline may include adjusting different modes of operation of a vehicle engine, such as the engine depicted in FIG. 1B. Further, the vehicle may include a controller configured to perform a routine, such as routine discussed at FIG. 3 to detect a number of occupants within the vehicle, and adjust one or more vehicle operating parameters based on the number of occupants. Specifically, the controller may perform a routine discussed at FIG. 4 in conjunction with the routine at FIG. 3 to adjust exhaust gas recirculation operation when zero occupants are present. For example, a desire EGR percentage threshold may be adjusted such that fuel economy improvement is favored over NVH when zero occupants are present. Accordingly, when one or more occupants are present, the vehicle controller may utilize a first EGR map, based on engine speed, load, and nominal NVH constraints, for determining the desired EGR percentage; and when zero occupants are present, the vehicle controller may utilize a second adjusted EGR map, based on engine speed, load and reduced NVH constraints, for determining the desired EGR percentage. Further, the controller may perform a routine discussed at FIG. 5 in conjunction with the routine at FIG. 3 to adjust idle operation when zero occupants are present. Further, the controller may perform a routine discussed at FIG. 6A in conjunction with the routine at FIG. 3 to adjust engine operating mode when zero occupants are present. For example, the engine may be a variable displacement engine (VDE). Thus, the engine may be operated in a partial-cylinder operation mode (also referred to herein as VDE mode) to reduce fuel usage. However, engine operation in the VDE mode is generally restricted to mid-engine speed at low to moderate loads when one or more occupants are present to reduce NVH experienced by the occupants and thereby, improve drivability. However, when zero occupants are present in the vehicle, concern for drivability may be reduced. Thus, VDE mode of engine operation may be expanded to higher loads and lower engine speeds (e.g., idle or near idle speeds) to improve fuel economy. Example operating ranges of engine operation in VDE mode based on the number of occupants is illustrated in a graph at FIG. 6B. Further, the controller may perform a routine discussed at FIG. 7A in conjunction with the routine at FIG. 3 to adjust a torque converter operation when zero occupants are present. For example, a decrease in torque converter slip may increase fuel economy by decreasing torque loss during torque conversion, while possibly increasing NVH due to decreased dampening effect. Thus, when zero occupants are detected, torque converter operation may be adjusted towards less slip to improve fuel economy while compromising NVH. An example adjustment of a torque converter slip schedule responsive to detecting zero occupants in the vehicle is depicted in FIG. 7B. Further, the controller may perform a routine discussed at FIG. 8A in conjunction with the routine at FIG. 3 to adjust noise vibration and harshness (NVH) limits of the vehicle during lugging conditions when zero occupants are detected. An example adjustment of lugging NVH thresholds based on number of occupants within the vehicle is illustrated at FIG. 8B. Further, the controller may perform a routine discussed at FIG. 9 in conjunction with the routine at FIG. 3 to adjust a transmission shift schedule when zero occupants are detected. For example, when one or more occupants are present, the controller may utilize a first transmission shift schedule, based on nominal NVH constraints, to make upshift and downshift decisions; and when zero occupants are detected within the vehicle, the controller may utilize a second transmission shift schedule, based on reduced NVH constraints, to favor fuel economy over NVH. Further, the controller may perform a routine discussed at FIG. 10 in conjunction with the routine at FIG. 3 to adjust a deceleration fuel shut off (DFSO) operation when zero occupants are detected. For example, DFSO operating range may be expanded when zero occupants are present to improve fuel economy. In one example, entry into DFSO may be expedited, and exit from DFSO may be delayed when zero occupants are detected to improve fuel economy while compromising NVH. Further, in some examples, additionally, one or more of air conditioning clutch cycling and operation of a solenoid valve of a HP pump may be adjusted to improve fuel economy when zero occupants are detected. The air conditioning temperature set point also may be raised when zero occupants are detected and lowered when the vehicle is nearing a passenger pick-up location. Further, it will be appreciated that examples where the above-mentioned adjustments when zero occupants are detected may be performed in coordination with one another are also within the scope of the disclosure.

FIG. 1A illustrates an example vehicle propulsion system 100. Vehicle propulsion system 100 includes a fuel burning engine 110 and a motor 120. While the vehicle propulsion system 100 illustrated in FIG. 1A is a hybrid-propulsion system, it will be appreciated that the embodiments described herein, including the methods described with respect to FIGS. 3-10 are applicable to vehicle propulsion systems that are solely driven by an engine and are configured with autonomous driving capability.

As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 123 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 121 while motor 120 is deactivated. During other operating conditions, both engine 110 and motor 120 may each be operated to propel the vehicle via drive wheel 130 as indicated by arrows 121 and 123, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, as indicated by arrow 116, which may in turn supply electrical energy to one or more of motor 120 as indicated by arrow 141 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 143 for storing fuel on-board the vehicle. For example, fuel tank 143 may store one or more liquid fuels, including but not limited to: gasoline, diesel, and alcohol fuels. In some examples, the fuel may be stored on-board the vehicle as a blend of two or more different fuels. For example, fuel tank 143 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 121 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Vehicle propulsion system 100 may include a heating ventilation and air conditioning (HVAC) system (not shown). The HVAC system may include an evaporator for cooling vehicle cabin air. Air may be passed over the evaporator via a fan and directed around the vehicle cabin. A climate controller (not shown) may operate the fan according to operator settings (received via an operator interface) as well as climate sensors. Further, the climate controller may operate the fan based on a number of occupants sensed within the vehicle. An evaporator temperature sensor (not shown) may provide an indication of the temperature of evaporator to the climate controller. A cabin temperature sensor may provide an indication of cabin temperature to the climate controller. The climate controller may also receive operator inputs from an operator interface and supply desired evaporator temperature and actual evaporator temperature to control system 190. The operator interface may allow an operator to select a desired cabin temperature, fan speed, and distribution path for conditioned cabin air. In one example, responsive to detecting zero occupants within the vehicle, a controller of the control system 190 may increase a desired air conditioning set point, and lower the desired air conditioning set point when nearing a passenger pick-up location (e.g., when a distance from a passenger pick-up location is below a threshold distance).

Control system 190 may communicate with one or more of engine 110, motor 120, fuel system 140, energy storage device 150, and generator 160. For example, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 111 having a remote start button 105. In other examples (not shown), a remote engine start may be initiated via a cellular telephone, or smartphone based system where a user's cellular telephone sends data to a server and the server communicates with the vehicle to start the engine.

Further, control system 190 may include an autonomous driving module 191 that comprises instructions for autonomously and/or semi-autonomously, i.e., wholly or partially without operator input, operating the vehicle propulsion system 100. The vehicle propulsion system 100 may further include autonomous driving sensors 193 and an autonomous controller within the module that receives signals generated by the autonomous driving sensors (e.g., sensors for driving the vehicle in an autonomous mode) and controls at least one vehicle subsystem to operate the vehicle in autonomous mode according to the signals received. The autonomous sensors 193 may include any number of devices configured to generate signals that help navigate the vehicle propulsion system 100 while operating in an autonomous mode. Examples of autonomous sensors 193 may include a radar sensor, a lidar sensor, a camera, or the like. The autonomous sensors 193 help the vehicle propulsion system 100 "see" the roadway and/or various obstacles while operating in the autonomous mode.

The autonomous mode controller may be configured to control one or more subsystems while the vehicle propulsion system is operating in the autonomous mode. Examples of subsystems that may be controlled by the autonomous mode controller may include a brake subsystem, a suspension subsystem, a steering subsystem, a HVAC subsystem, and a powertrain subsystem. The autonomous mode controller may control any one or more of these subsystems by outputting signals to control units associated with these subsystems.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 143 may be configured to store the fuel received from fuel dispensing device 170 until it is supplied to engine 110 for combustion. In some embodiments, control system 190 may receive an indication of the level of fuel stored at fuel tank 143 via a fuel level sensor. The level of fuel stored at fuel tank 143 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and sensors dedicated to indicating the occupancy-state of the vehicle, for example seat load cells 107, door sensing technology 108, and onboard cameras 109. In some examples, sensors dedicated to indicating occupancy-state of the vehicle may include including one or more of a thermal imaging system including an infra-red camera, and a seat sensing system including one or more seat pressure sensors coupled to each vehicle seat. Vehicle propulsion system 100 may also include inertial sensors 199. Inertial sensors may comprise one or more of the following: longitudinal, latitudinal, vertical, yaw, roll, and pitch sensors. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

Further, in some embodiments, the vehicle instrument panel 196 may include an interface for selecting an occupant-preferred mode of vehicle operation. For example, the vehicle occupant and/or driver may select a preference for fuel economy over NVH, and vice-versa. Specifically, when the occupant selects a first mode that favors fuel economy over NVH reduction, the control unit 190 may reduce NVH constraints, and adjust one or more actuators of the vehicle to control vehicle operation to improve fuel economy. When the occupant selects a second mode that favors NVH reduction over fuel economy, the control unit 190 may utilize nominal NVH constraints, and adjust one or more actuators of the vehicle to control vehicle operation to improve drivability. In some examples, more stringent NVH constraints (e.g., which are higher than nominal) may be employed when the occupant selects the second mode that favors NVH reduction over fuel economy.

Further, the control unit 190 may adjust vehicle operation based on number of occupants in the vehicle, as described below with respect to FIGS. 3-10. Specifically, when zero occupants are detected within the vehicle (based on indications from the sensors 107, 108, and 109 indicating an occupancy state of the vehicle), the control unit 190 may adjust one or more vehicle operating parameters to adjust a balance between fuel economy and NVH, such that fuel economy improvement is favored over drivability. For example, when zero occupants are detected, NVH constraints are no longer applicable. Therefore, when zero occupants are present, vehicle operation may be adjusted for improving fuel economy while compromising NVH as NVH will not drive customer complaints through interaction with the occupant. In this way, by utilizing zero occupant information, the control unit may adjust vehicle operation to allow NVH excitations from the vehicle powertrain, and increase fuel economy. Details of adjusting one or more vehicle operating parameters when zero occupants are present will be further elaborated below with respect to FIGS. 3-10. The methods and systems described herein provide the technical result of improved fuel economy when zero occupants are present in the vehicle due to reduction of NVH constraints.

Figure 1B:
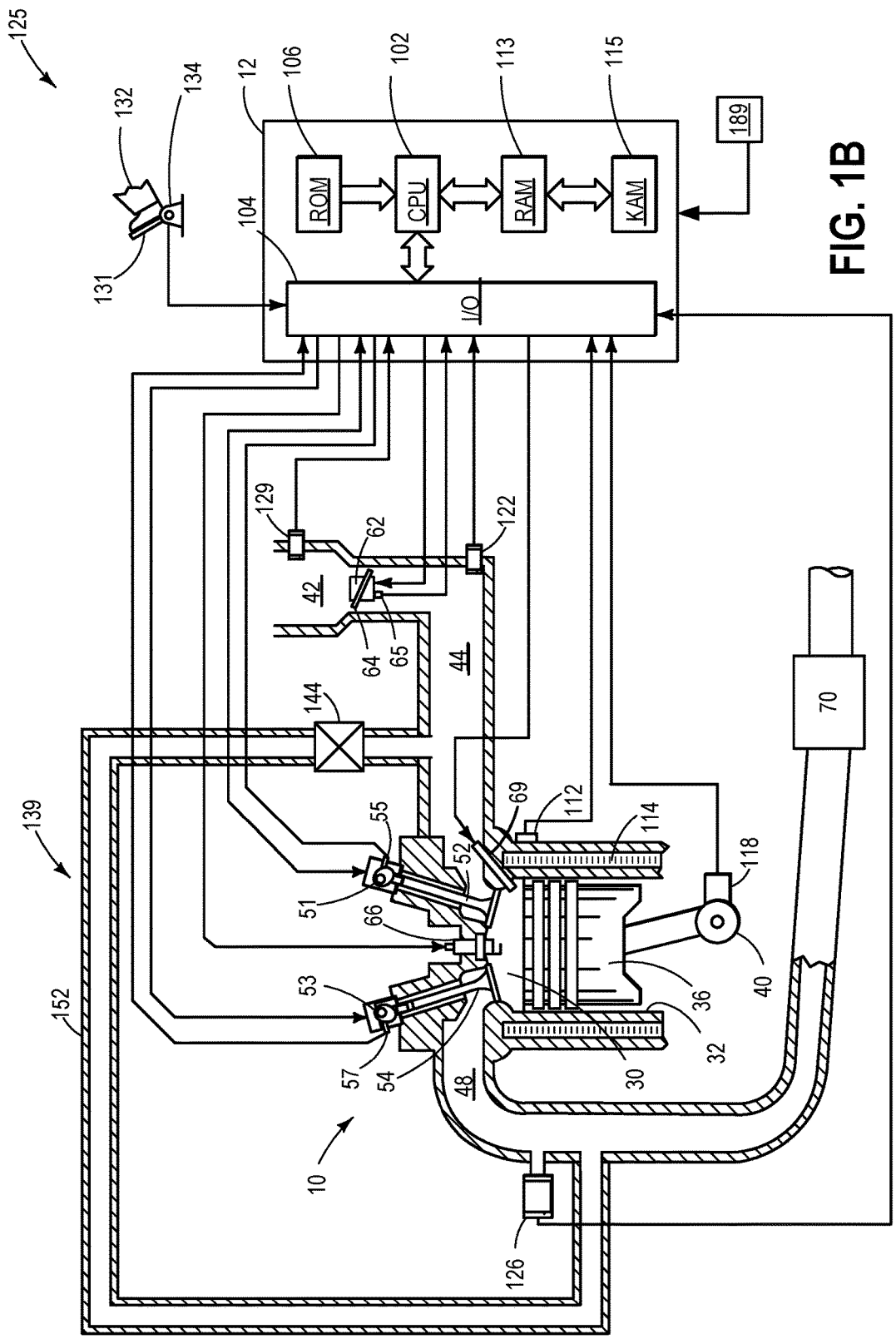
FIG. 1B shows a schematic diagram of an engine.

Continuing to FIG. 1B, a schematic diagram showing one cylinder of a multi-cylinder engine 10 in an engine system 125, which may be included in a propulsion system of an vehicle, such as vehicle propulsion system 100 at FIG. 1A, is shown. The engine 10 may be an example of engine 110 at FIG. 1A. The engine 10 may be controlled at least partially by a control system including a controller 12 and by input from a vehicle operator 132 via an input device 131. In this example, the input device 131 includes an accelerator pedal and a pedal position sensor 134 for generating a proportional pedal position signal.

In some embodiments, during an autonomous mode of vehicle operation, the engine 10 may be controlled at least partially by the control system via instructions stored in the controller 12 (alternatively, an autonomous controller (not shown) may control the engine during the autonomous mode) and by input from one or more autonomous sensors 189. Examples of autonomous sensors 189 may include a radar sensor, a lidar sensor, a camera, or the like.

A combustion chamber 30 of the engine 10 may include a cylinder formed by cylinder walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some examples, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative examples, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

A fuel injector 69 is shown coupled directly to combustion chamber 30 for injecting fuel directly therein in proportion to the pulse width of a signal received from the controller 12. In this manner, the fuel injector 69 provides what is known as direct injection of fuel into the combustion chamber 30. The fuel injector may be mounted in the side of the combustion chamber or in the top of the combustion chamber, for example. Fuel may be delivered to the fuel injector 69 by a fuel system (not shown) including a fuel tank, a fuel pump, and a fuel rail. In some examples, the combustion chamber 30 may alternatively or additionally include a fuel injector arranged in the intake manifold 44 in a configuration that provides what is known as port injection of fuel into the intake port upstream of the combustion chamber 30.

Spark is provided to combustion chamber 30 via spark plug 66. The ignition system may further comprise an ignition coil (not shown) for increasing voltage supplied to spark plug 66. In other examples, such as a diesel, spark plug 66 may be omitted.

The engine 10 may operate in various modes. For example, the controller 12 may deactivate various numbers of cylinders, such as one cylinder or a plurality of cylinders, and operate the engine with the rest of the cylinders that remain active. In the embodiment illustrated in FIG. 2, actuation systems for the intake valves 52 and exhaust valves 54 as described above may control valve opening and closing, which can be used to provide one or more reduced displacement operating modes with one or more cylinders deactivated and not combusting fuel. As used herein, a reduced displacement mode includes an engine operating mode where one or more cylinders do not combust fuel to power the crankshaft while deactivated. During the reduced or variable displacement operating modes, one or more cylinders may be deactivated by modifying or disabling operation of the intake valves, exhaust valves, or both in combination with cutting off fuel provided to the deactivated cylinders.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal. The intake passage 42 may include a mass air flow sensor 120 and a manifold air pressure sensor 122 for sensing an amount of air entering engine 10.

An exhaust gas sensor 126 is shown coupled to the exhaust passage 48 upstream of an emission control device 70 according to a direction of exhaust flow. The sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 126 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 70 is shown arranged along the exhaust passage 48 downstream of the exhaust gas sensor 126. The device 70 may be a three way catalyst (TWC), $NO_x$ trap, various other emission control devices, or combinations thereof. In some examples, during operation of the engine 10, the emission control device 70 may be periodically reset by operating at least one cylinder of the engine within a particular air-fuel ratio.

An exhaust gas recirculation (EGR) system 139 may route a desired portion of exhaust gas from the exhaust passage 48 to the intake manifold 44 via an EGR passage 152. The amount of EGR provided to the intake manifold 44 may be varied by the controller 12 via an EGR valve 144. Under some conditions, the EGR system 139 may be used to regulate the temperature of the air-fuel mixture within the combustion chamber, thus providing a method of controlling the timing of ignition during some combustion modes.

Figure 2:
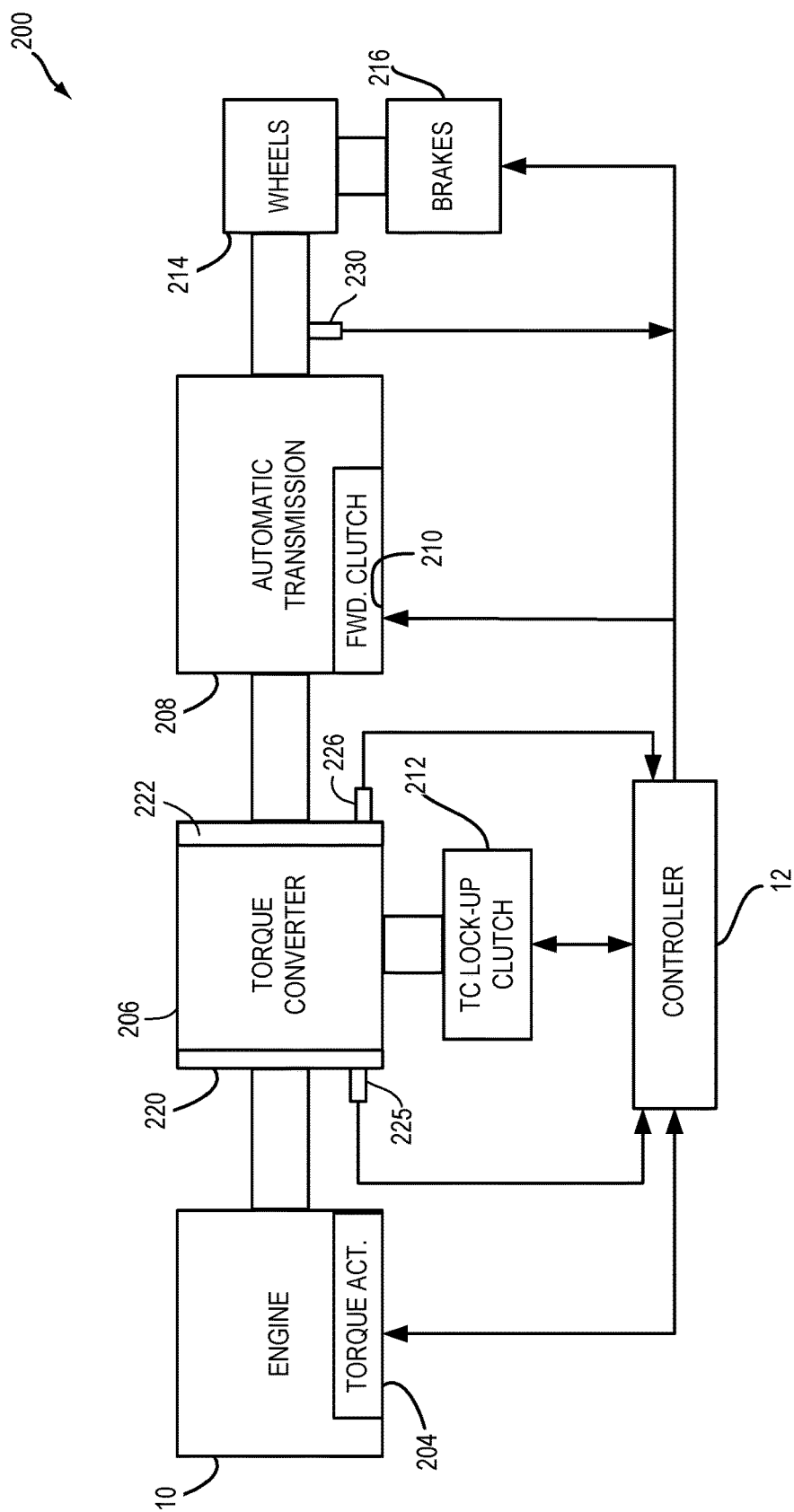
FIG. 2 shows an example vehicle driveline configuration.

The controller 12 is shown in FIG. 2 as a microcomputer, including a microprocessor unit 102, input/output ports 104, an electronic storage medium for executable programs and calibration values shown as read only memory chip 106 (e.g., non-transitory memory) in this particular example, random access memory 113, keep alive memory 115, and a data bus. The controller 12 may receive various signals from sensors coupled to the engine 10, in addition to those signals previously discussed, including measurement of inducted mass air flow (MAF) from the mass air flow sensor 129; engine coolant temperature (ECT) from a temperature sensor 112 coupled to a cooling sleeve 114; an engine position signal from a Hall effect sensor 118 (or other type) sensing a position of crankshaft 40; throttle position from a throttle position sensor 65; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 44. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

In some embodiments, during an autonomous mode of vehicle operation, the engine 10 may be autonomously controlled by the controller 12 based on signals received from autonomous sensors, such as autonomous sensors described with respect to FIG. 1A. In some examples, an autonomous controller within the control module may control engine operation during the autonomous mode.

As described above, FIG. 1B shows only one cylinder of a multi-cylinder engine, and each cylinder may similarly include its own set of intake/exhaust valves, fuel injector, spark plug, etc.

As will be appreciated by someone skilled in the art, the specific routines described below in the flowcharts may represent one or more of any number of processing strategies such as event driven, interrupt-driven, multi-tasking, multi-threading, and the like. As such, various acts or functions illustrated may be performed in the sequence illustrated, in parallel, or in some cases omitted. Like, the order of processing is not necessarily required to achieve the features and advantages, but is provided for ease of illustration and description. Although not explicitly illustrated, one or more of the illustrated acts or functions may be repeatedly performed depending on the particular strategy being used. Further, these figures graphically represent code to be programmed into the computer readable storage medium in controller 12 to be carried out by the controller in combination with the engine hardware, as illustrated in FIG. 1B.

FIG. 2 is a block diagram of a vehicle drive-train 200. Drive-train 200 may be powered by engine 10. Engine 10 is described with respect to FIG. 1B. Drive train 200 may be included a vehicle propulsion system, such as vehicle propulsion system 100 in FIG. 1A. In one example, engine 10 may be a gasoline engine. In alternate examples, other engine configurations may be employed, for example, a diesel engine. Engine 10 may be started with an engine starting system (not shown). Further, engine 10 may generate or adjust torque via torque actuator 204, such as a fuel injector, throttle, etc.

An engine output torque may be transmitted to torque converter 206 to drive an automatic transmission 208 by engaging one or more clutches, including forward clutch 210, where the torque converter may be referred to as a component of the transmission. Torque converter 206 includes an impeller 220 that transmits torque to turbine 222 via hydraulic fluid. One or more clutches may be engaged to change mechanical advantage between the engine vehicle wheels 214. Impeller speed may be determined via speed sensor 225, and turbine speed may be determined from speed sensor 226 or from vehicle speed sensor 230. The output of the torque converter may in turn be controlled by torque converter lock-up clutch 212. As such, when torque converter lock-up clutch 212 is fully disengaged, torque converter 206 transmits torque to automatic transmission 208 via fluid transfer between the torque converter turbine and torque converter impeller, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque relayed to the transmission to be adjusted. Although one lock-up clutch 212 is provided, the torque converter 206 may also contain more than one lock-up clutches. The lock-up clutch 212 may be of various types that can allow various states of engagements between the pump impeller 220 and the turbine 222, such as a wet-type friction clutch, by for example providing various degrees of slip between the pump impeller 220 and the turbine 222. The lock-up clutch may be electronically control via an electromechanical actuator, electro-hydraulic actuator, etc.

As described with respect to FIG. 1B, engine 10 may be controlled by controller 12. Controller 12 may be configured to adjust the amount of torque transmitted by the torque converter by adjusting the torque converter lock-up clutch in response to various engine operating conditions, or based on a driver-based engine operation request. The controller 12 may also control the operation of the lock-up clutch 212 through a lock-up clutch actuator (not shown). For example, the controller 12 may sense a vehicle operating condition (e.g., through the various sensors and actuators, such as those described with respect to FIGS. 1A and 1B), calculates a target lock-up clutch engagement pressure, which corresponds to a target engagement state for the pump impeller 220 and the turbine 22, and then sends signals to the lock-up clutch actuator to cause the lock-up clutch 212 to apply the target engagement pressure to the pump impeller 220 and turbine runner 222.

The engagement state between the pump impeller 220 and the turbine 222 may depend on the lock-up clutch engagement pressure applied. For example, if the engagement pressure (PEN) is at or above a threshold value (PA), or PEN≥PA, the pump impeller 220 and turbine 222 become fully engaged, that is they move as an integral part; if the engagement pressure is at or below a threshold value PB, the pump impeller 220 and the turbine 222 become completely disengaged, leaving only a fluid coupling between the pump impeller 220 and the turbine 222; and if the engagement pressure is between threshold values PA and PB the pump impeller 220 and the turbine 222 become partially engaged, allowing some slip between the pump impeller 220 and the turbine runner 222, and the slip decreases with an increase in the engagement pressure.

For example, a slip of 0% occurs when the pump impeller 220 and the turbine 222 are fully engaged and moves as an integral part. A slip of 100% indicates that there is a complete fluid coupling and no mechanical engagement between the pump impeller 220 and the turbine 222. A slip between 0 to 100% indicates that the pump impeller and the turbine runner are partially mechanically engaged and there is some slip between them. As the slip decreases, the engagement between the pump impeller 220 and the turbine 222 increases.

Torque output from the automatic transmission 208 may in turn be relayed to wheels 214 to propel the vehicle. Specifically, automatic transmission 208 may adjust an input driving torque at the input shaft (not shown) responsive to a vehicle traveling condition before transmitting an output driving torque to the wheels.

Further, wheels 214 may be locked by engaging wheel brakes 216. In one example, wheel brakes 216 may be engaged in response to the driver pressing his foot on a brake pedal (not shown). In the similar way, wheels 214 may be unlocked by disengaging wheel brakes 216 in response to the driver releasing his foot from the brake pedal. During an autonomous mode of engine operation, brakes may be engaged or disengaged based on indication from one or more autonomous sensors.

A mechanical oil pump (not shown) may be in fluid communication with automatic transmission 208 to provide hydraulic pressure to engage various clutches, such as forward clutch 210 and/or torque converter lock-up clutch 212. The mechanical oil pump may be operated in accordance with torque converter 206, and may be driven by the rotation of the engine or transmission input shaft, for example. Thus, the hydraulic pressure generated in mechanical oil pump may increase as an engine speed increases, and may decrease as an engine speed decreases.

In one example, torque converter operation may be adjusted based on a number of occupants detected in the vehicle. For example, when zero occupants are detected within the vehicle, the controller may apply reduced NVH constraints to improve fuel economy as concern for NVH is decreased. Accordingly, the controller may adjust a torque converter slip towards less slip. In some examples, the controller may utilize a look-up table based on reduced NVH constraints to determine a desired torque converter slip and adjust the torque converter actuator to provide the desired slip. For a given engine speed and load, when zero occupants are present, the desired torque converter slip may be less than when one or more occupants are present. By decreasing the torque converter slip when zero occupants are present, fuel economy may be improved by reducing torque loss during conversion while NVH may increase due to less dampening effect. However, concern for NVH may be reduced when zero occupants are present and torque converter operation may be adjusted for improving fuel economy over NVH. In some examples, torque converter operation may be adjusted based on an operator selected setting (or mode) for a preference between fuel economy and NVH. A degree of decrease in slip when torque converter slip is decreased based on number of occupants may be greater compared to a degree of decrease in slip when the decrease in slip is based on a driver selected mode that prefers fuel economy over NVH.

In this way, torque converter operation may be adjusted based on a number of occupants to provide greater fuel economy benefits. Additionally, various vehicle operations, such as VDE, EGR, DFSO, idle, etc., may be adjusted based on the number of occupants detected within the vehicle. Details of adjusting the various vehicle operations based on the number of occupants to improve fuel economy will be further elaborated with respect to FIGS. 3-10 below.

Figure 3:
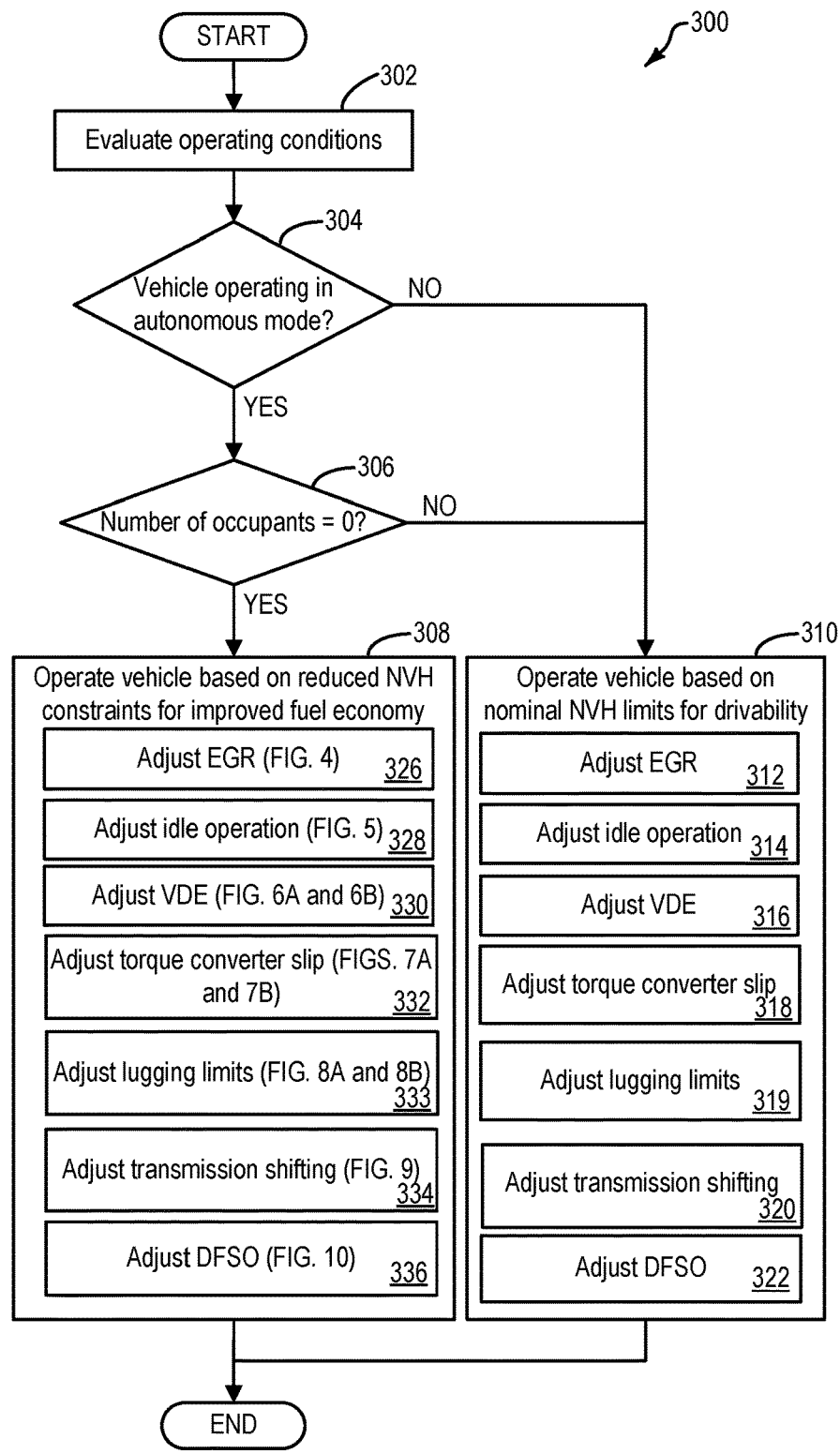
FIG. 3 show a flowchart illustrating an example method for adjusting vehicle operation based on a number of occupants detected.

Turning to FIG. 3, a flow chart illustrating an example method 300 for adjusting vehicle operation based on a number of occupants in a vehicle. Specifically, method 300 includes adjusting vehicle operation by lowering NVH constraints to improve fuel economy when the vehicle is operating in an autonomous mode and zero occupants are present in the vehicle. Instructions for carrying out method 300 and other methods included herein may be executed by a controller of the vehicle system, such as controller 12 at FIGS. 1A, 1B, and 2, based on instructions stored in non-transitory memory of the controller, and in conjunction with signals received from sensors of the vehicle system, such as the sensors described above with reference to FIGS. 1A, 1B, and 2. The controller may employ actuators of the vehicle system, such as the actuators described with reference to FIGS. 1A, 1B, and 2, to adjust vehicle operation based on number of occupants, particularly to adjust vehicle operation to increase fuel economy while reducing NVH constraints when zero occupant are detected, according to the methods described below.

Method 300 begins at 302. At 302, method 300 includes evaluating vehicle operating conditions. Vehicle operating conditions may include a mode of vehicle operation (e.g., autonomous, semi-autonomous, or operated by an operator), a number of occupants in the vehicle, ambient conditions, engine operating conditions, heating ventilation and air conditioning (HVAC) conditions, and fuel system operating conditions. Engine operating conditions may include engine load, engine speed, mode of engine operation (e.g., VDE or non-VDE), exhaust gas recirculation parameters, amount of throttle valve opening, engine temperature, spark timing, transmission gear ratio, and exhaust catalyst temperature. Fuel system operating conditions may include refueling conditions, fuel tank pressure, fuel tank temperature, fuel pump operating conditions, fuel system diagnostic conditions, and evaporative emissions system conditions. Ambient conditions may include ambient humidity, ambient temperature, and ambient pressure. HVAC conditions may include air conditioning system status, air conditioning clutch voltage, condenser fan speed, and cabin temperature. Evaluating vehicle operating conditions may also include evaluating road condition during vehicle operation. Road conditions may include road roughness, and inclination. Vehicle operating conditions may be estimated and/or measured by utilizing one or more sensors of the vehicle system, such as sensors described with respect to FIGS. 1A, 1B, and 2.

Next, method 300 proceeds to 304. At 304, method 300 includes determining if vehicle is operating in an autonomous mode. If the vehicle is operating in an autonomous mode, the answer at 304 is NO, and method 300 proceeds to 310. At 310, method 300 includes operating the vehicle based on nominal NVH constraints. For example, when the vehicle is not operating in the autonomous mode, a vehicle operator is controlling the operation of the vehicle. Therefore, one or more parameters of vehicle operation may be adjusted such that impact of the noise, vibration, and harshness experienced by the operator or occupants in the vehicle are reduced and drivability is improved.

The one or more parameters of the vehicle operation may include at 312, EGR operation. For example, an amount of EGR delivered may be limited based on NVH constraints. In one example, during idle conditions, when nominal NVH constraints are used, EGR may not be delivered (that is desired EGR may be zero) in order to reduce idle roughness when engine is operating at idle speed and load. In another example, when nominal NVH constraints are used, during rough road conditions (that is, when the vehicle is travelling on rough road), EGR may be disabled to reduce NVH and improve drivability. In yet another example, in vehicles equipped with an EGR cooler, when nominal NVH constraints are applied, during cold start conditions, EGR may be disabled for a threshold duration after light-off until a desired EGR cooler temperature is reached. Delaying EGR after catalyst light-off provides reduced NVH and increases drivability.

Further, at 314, idle operation may be adjusted to reduce NVH. For example, when the engine is operating at idle conditions, a VDE mode of operation may be disabled, and an amount of spark retard may be limited based on NVH constraints.

Further, at 316, VDE mode of operation may be adjusted. For example, during VDE conditions, a number of cylinders deactivated may be reduced to reduce NVH. That is, the number of cylinders that may be deactivated in the VDE may be based on nominal NVH constraints for improved drivability.

Further, at 318, method 300 includes adjusting a torque converter slip rate. For example, when a lock-up clutch is locked (lock-up mode), a direct connection is provided between the engine and transmission, which increases efficiency. However, in the lock-up mode, due to mechanical coupling via the lock-up clutch, drivetrain noise and vibration is experienced by the operator and/or occupants in the vehicle. In order to provide improved drivability, the torque converter may be allowed to slip, thereby increasing fluidic coupling and decreasing mechanical coupling. The fluidic coupling dampens the sensitivity to drivetrain vibration, thereby improving NVH performance. An amount of slip may be based on drivetrain resonance for a given engine speed. Specifically, the amount of slip may be determined based on a torque converter slip schedule or map stored in a memory of a controller. The map may be used to determine the desired torque converter slip that provides desired dampening effect for the current engine load and speed. The controller may then adjust a torque converter actuator to provide the desired slip.

Further, at 319, a lugging NVH limit may be based on nominal NVH constraints. For example, at lower engine speeds, if a torque converter slip is reduced below a threshold torque converter slip (e.g., 30 rpm or lower), the vehicle would fail to meet the desired NVH target for drivability. Specifically, an NVH mode known as lugging caused by impulsive inputs due to delivering high combustion torques can be induced if too much torque is requested at low engine speeds when the gear ratio is too high. Torque converter may be used to control NVH associated with lugging. Specifically, slipping the torque converter increases damping. As a result, sensitivity of driveline vibrations to engine torque excitation is reduced, which improves NVH. Thus, during lugging conditions, vehicle may be operated with a torque converter slip above a threshold torque converter slip in order to meet desired NVH level and maintain drivability. In other words, torque converter operation is adjusted such that desired NVH levels are maintained during lugging.

Further, at 320, a transmission shift schedule for improved NVH may be use. For example, Upshift and Downshift decisions may be based on the maximum torque available at any given time to ensure good drivability and good NVH.

Further, at 322, DFSO operation may be adjusted. Specifically, transition into and out of DFSO may be adjusted. For example, when DFSO conditions are met, deactivation of fuel injectors to all cylinders may be delayed. Further, in order to improve NVH, activation of fuel injectors may be performed earlier, responsive to break release and vehicle speed greater than a threshold speed. Further, DFSO may be disabled under low gear operation, and all-wheel drive operation.

Further, additionally, operation of a solenoid valve of a HP pump may be adjusted to reduce NVH during low speed engine operation. Furthermore, in some examples, additionally, air conditioning compressor clutch cycling may be adjusted for reduced NVH. Returning to 304, if the vehicle is operating in an autonomous mode, the answer at 304 is YES, and method 300 proceeds to 306. At 306, method 300 includes determining if a number of occupants in the vehicle is zero. The number of occupants may be determined based on one or more of a seat pressure sensor, an infra-red sensor, or one or more cameras to identify occupants within the vehicle. If the number of occupants in the vehicle is greater than zero, method 300 proceeds to 310. At 310, the vehicle may be operated for improved drivability as discussed above. If the number of occupants in the vehicle is zero, method 300 proceeds to 308. At 308, method 300 includes operating the vehicle by implementing reduced NVH constraints for adjusting one or more vehicle operating parameters to achieve improvement in fuel economy. Specifically, method 300 includes adjusting EGR operation at 326. Details of adjusting EGR operation for improved fuel economy by reducing NVH constraints will the elaborated at FIG. 4. Further, at 328, method 300 includes adjusting idle operation. Details of adjusting idle speed operation for improved fuel economy by reducing NVH constraints will the elaborated at FIG. 5. Further, at 330, VDE operation may be adjusted. Details of adjusting VDE operation for improved fuel economy by reducing NVH constraints will the elaborated at FIGS. 6A and 6B. Further, at 332, a torque converter slip rate may be adjusted. Details of adjusting torque converter operation for improved fuel economy by reducing NVH constraints will the elaborated at FIGS. 7A and 7B. Further, at 333, lugging limits may be adjusted. Details of adjusting lugging limits for improved fuel economy by reducing NVH constraints will the elaborated at FIGS. 8A and 8B. Further, at 334, transmission shifting may be adjusted. Details of adjusting transmission shift schedule for improved fuel economy by reducing NVH constraints will the elaborated at FIG. 9. Further, at 336, method 300 includes adjusting DFSO operation. Details of adjusting DFSO operation for improved fuel economy by reducing NVH constraints will the elaborated at FIG. 10.

In this way, by reducing NVH constraints during autonomous vehicle operating conditions when there are no occupants in the vehicle, fuel economy may be improved.

In some applications, transmission clutch slippage during shifting also may be used and controlled based on the number of occupants. For example, transmission clutch slippage during gear shifts may be used to provide an occupant with a sensation of smoother gear shifts. When an occupant is not present, transmission clutch slippage may be decreased to improve fuel economy. Transmission clutch shifting during gear shifts may be used in place of, or in addition to, adjusting the torque converter lock-up clutch during shifting described with reference to FIG. 9, step 908.

In another possible application, vehicles having stop/start capability may be controlled during mode transitions between stop and start dependent upon the presence or absence of occupants. Without an occupant, more aggressive engine stopping may be programmed for improved fuel economy at the cost of more abrupt stops and starts. For example, the vehicle speed at which the engine is shut-off when stopping may be increased when an occupant is not present for improved fuel economy. Engine stop (also referred to as engine shut-off) may be performed by deactivating one or more of fuel injection and spark, for example. Further, in some examples, when one or more occupants are present within the vehicle, the vehicle operator may choose to operate the vehicle in a first mode, where NVH and drivability is given preference to fuel economy, or a second mode, where NVH and drivability are compromised for better fuel economy. The operator may choose between the first mode and the second mode via a driver interface. Upon receiving input from the operator, the vehicle controller may adjust vehicle operation to improve NVH and drivability while compromising fuel economy or vice-versa. When the first mode is chosen, one or more parameters of vehicle operation may be adjusted such that impact of the noise, vibration, and harshness experienced by the operator or occupants in the vehicle are reduced and drivability is improved. Thus, when the first mode is chosen, the vehicle may be operated as described with respect to step 310. When the second mode is chosen, one or more parameters of the vehicle are adjusted for improved fuel economy while compromising NVH and drivability. Thus, when the second mode is chosen, the vehicle may be operated as described with respect to step 308.

In some examples, when the second mode is chosen by the operator, one or more parameters of the vehicle may be adjusted based on reduced NVH constraints, however the reduction in NVH constraints may be less than when zero occupants are present, such that drivability is not severely compromised.

Figure 4:
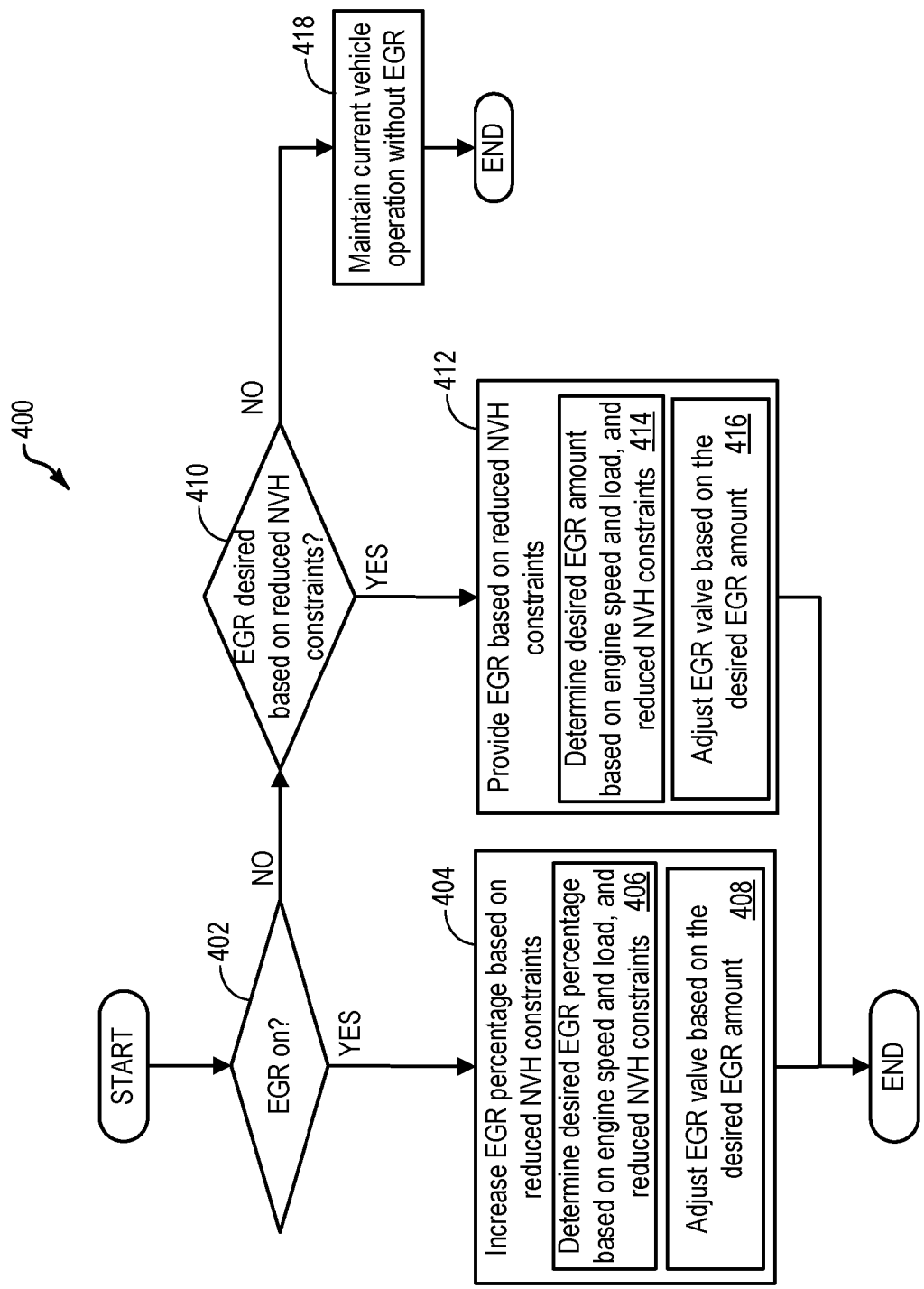
FIG. 4 shows a flowchart illustrating an example method for controlling exhaust gas recirculation of the vehicle when zero occupants are detected, to be used in conjunction with the method of FIG. 3.

Turning to FIG. 4, an example method 400 for adjusting EGR operation during autonomous vehicle operation with zero occupants is shown. Method 400 may be performed in coordination with method 300 at FIG. 3. Method 400 will be described herein with reference to the components and systems depicted in FIGS. 1A, 1B, and 2, though it should be understood that the method may be applied to other systems without departing from the scope of this disclosure. Instructions for carrying out method 400 may be executed by a controller, such as controller 12 at FIGS. 1A, 1B, and 2, based on instructions stored in non-transitory memory of the controller, and in conjunction with signals received from sensors of the vehicle system, such as the sensors described above with reference to FIGS. 1A, 1B, and 2. The controller may employ actuators of the vehicle system, such as the actuators described with reference to FIGS. 1A, 1B, and 2, to adjust vehicle operation based on number of occupants. In particular, the controller may adjust exhaust gas recirculation operation by adjusting position of an EGR valve, such as EGR valve 144 at FIG. 1B, via an actuator of the valve to increase fuel economy while reducing NVH constraints when zero occupant are detected, according to the method 400 described below.

Method 400 begins at 402. At 402, method 400 includes determining if engine is operating with exhaust gas recirculation enabled. For example, it may be determined that exhaust gas recirculation is enabled based on a position of the exhaust gas recirculation (EGR) valve. For example, an EGR valve position sensor may provide an indication of the EGR valve position to the controller. If the EGR valve is closed, it may be determined that the EGR is not enabled, and method 400 proceeds to 410. If the EGR valve is not closed, it may be determined that the EGR is being supplied to the engine, and method 400 proceeds to 404. The position of the EGR valve may be determined based on an indication from an EGR valve position sensor coupled to the EGR valve.

At 404, method 400 includes increasing EGR supplied to the engine based on reduced NVH constraints. Increasing EGR may include, at 406, determining a desired EGR percentage of intake air based on engine speed, load, and reduced NVH constraints. Specifically, the desired EGR percentage of intake air may be higher when NVH constraints are reduced than when NVH constraints are imposed. Thus, the desired EGR dilution is higher when based on engine speed, load, and reduced NVH constraints than when based on engine speed, load, and nominal NVH constraints. In one example, a look up table mapping engine speed and load conditions to desired EGR percentage may be used to determine the desired EGR percentage. The look up table may be based on reduced NVH constraints. For example, the controller may determine the desired EGR percentage based on a calculation using the look-up table with the input being engine speed and load, and the output being the desired EGR percentage.

Further, based on the desired EGR percentage and mass air flow (MAF), a desired EGR flow may be calculated. The EGR valve is then adjusted, at 408, based on the desired EGR flow to provide the desired EGR percentage of intake air. The EGR valve may be adjusted by a valve actuator based on commands from the controller. In one example, when EGR is provided as a fixed percentage of intake air within a speed-load range (e.g. low to mid speed load range), the fixed percentage of intake air may be higher when NVH constraints are reduced than when nominal NVH constraints are used. In one example, when variable EGR is provided based on engine speed and load, the desired EGR percentage for a given speed and load may be higher when NVH constraints are reduced than when nominal NVH constraints are used.

After supplying the desired EGR, method 400 may return.

Returning to 402, if it is confirmed that EGR is not on, method 400 proceeds to 410. At 410, method 400 includes determining if EGR is desired based on reduced NVH constraints. For example, during idle conditions, when nominal NVH constraints are used, the EGR may not be delivered (that is desired EGR may be zero) in order to reduce idle roughness when engine is operating at idle speed and load. However, when no occupants are present in the vehicle and the vehicle is driven autonomously, NVH constraints may be reduced and EGR may be supplied to improve fuel economy during idle conditions. The EGR percentage may not exceed a first threshold, where the first threshold is based on an amount of EGR that can cause engine stalling under idle conditions. Thus, the amount of EGR supplied during idle conditions may be greater than zero but less than the first threshold such that fuel economy and emission benefits may be realized without causing engine stalling or severe combustion instability. In another example, when nominal NVH constraints are used, during rough road conditions (that is, when the vehicle is traveling on rough road), EGR may be disabled to reduce NVH and improve drivability. However, when no occupants are present, the NVH constraints may be relaxed. Accordingly, when the vehicle is travelling on rough road, EGR may not be disabled and a desired EGR percentage may be supplied for improved fuel economy and emissions. The desired EGR percentage may be based on engine speed and load, and reduced NVH constraints. In yet another example, in vehicles equipped with an EGR cooler, when nominal NVH constraints are applied, during cold start conditions, EGR may be disabled for a threshold duration after light-off until a desired EGR cooler temperature is reached. Delaying EGR after catalyst light-off provides reduced NVH and increases drivability. However, when no occupants are present in the vehicle, EGR may be provided without any delay after catalyst light-off temperature is reached in order to improve fuel economy.

At 410, if it is determined that EGR is desired method 400 proceeds to 412. At 412, method 400 includes delivering EGR, the EGR percentage determined based on reduced NVH constraints in addition to engine speed and load conditions. Accordingly, delivering EGR includes, at 414, determining a desired EGR percentage based on engine speed and load, and reduced NVH constraints. Based on the desired EGR percentage and mass air flow (MAF), a desired EGR flow may be calculated. The EGR valve is then adjusted, at 416, based on the desired EGR flow to provide the desired EGR percentage of intake air.

Returning to 410, if it is judged that EGR is not desired method 400 proceeds to 418. For example, during cold start conditions, for expediting catalyst light-off, it may be desirable to stop EGR flow until a threshold temperature is reached. Under such conditions, when the exhaust catalyst temperature is below the light-off temperature, EGR may not be provided and vehicle operation may be maintained without EGR until conditions for EGR delivery based on engine speed and load, and reduced NVH constraints are satisfied (e.g. until exhaust catalyst temperature measured based on an indication from an exhaust catalyst temperature sensor reaches a threshold light-off temperature).

In this way, during a first condition, when one or more occupants are present within the vehicle, an EGR percentage desired may be based on engine speed and load; and during a second condition, when zero occupants are present in the vehicle and the vehicle is operating in an autonomous mode, the EGR percentage desired may be based on engine speed and load, and reduced NVH constraints. During the first condition, one or more occupants are present in the vehicle, a first look-up table may be used that maps engine speed and load to desired EGR percentage based on nominal NVH constraints. During the second condition, when zero occupants are present in the vehicle, the controller may utilize a second look-up table that maps engine speed and load to desired EGR percentage based on reduced NVH constraints. Thus, for a given engine speed and load after engine cold start, the EGR percentage desired during the first condition may be less than the EGR percentage desired during the second condition. Consequently, for a given engine speed and load after engine cold start, the EGR flow during the first condition may be less than the EGR flow during the second condition. It will be appreciated that the amount of increase in EGR supply during the second condition may not increase above a threshold, where the threshold is based on combustion stability limits (or misfire limits).

Figure 5:
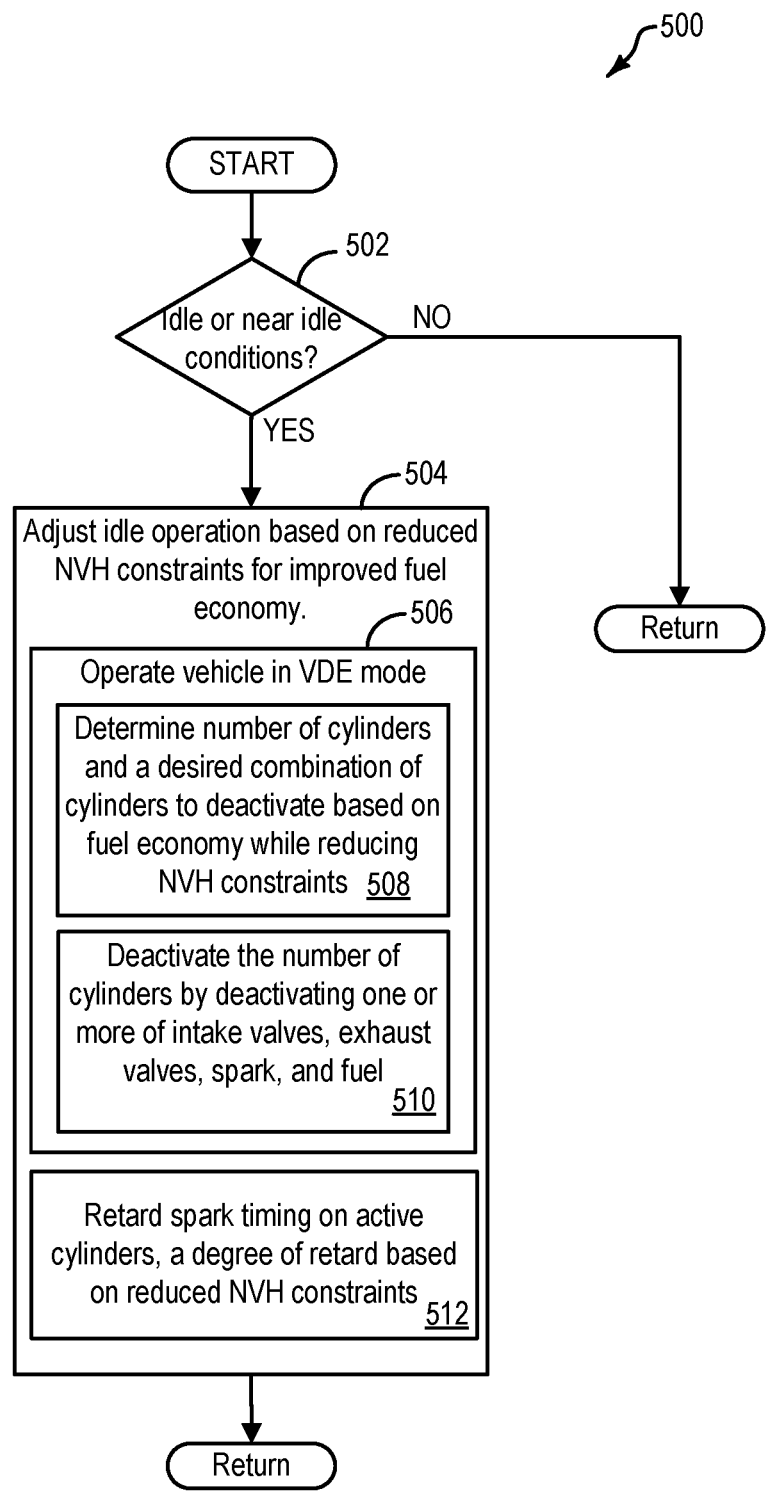
FIG. 5 shows a flowchart illustrating an example method for controlling idle operation of the vehicle when zero occupants are detected, to be used in conjunction with the method of FIG. 3.

Next, FIG. 5 shows an example method 500 for operating the vehicle during idle condition when it is determined that zero occupants are present within the vehicle. Method 500 may be performed in coordination with method 300 at FIG. 3. Method 500 will be described herein with reference to the components and systems depicted in FIGS. 1A, 1B, and 2, though it should be understood that the method may be applied to other systems without departing from the scope of this disclosure. Instructions for carrying out method 400 may be executed by a controller, such as controller 12 at FIGS. 1A, 1B, and 2, based on instructions stored in non-transitory memory of the controller, and in conjunction with signals received from sensors of the vehicle system, such as the sensors described above with reference to FIGS. 1A, 1B, and 2. The controller may employ actuators of the vehicle system, such as the actuators described with reference to FIGS. 1A, 1B, and 2, to adjust vehicle operation based on number of occupants. In particular, the controller may adjust idle operation by adjusting a VDE operation, via one or more actuators, such as a fuel injector actuator, to enable VDE operation during idle, to increase fuel economy while reducing NVH constraints when zero occupant are detected, according to the method 500 described below.

Method 500 begins at 502. At 502, method 500 includes determining if vehicle is operating under idle conditions. Idle conditions may be determined based on one or more of engine speed, vehicle speed, engine load, accelerator pedal position, brake pedal position, and throttle position. For example, idle conditions may be confirmed in response to one or more of a vehicle speed below a threshold speed, engine speed below a threshold engine speed, engine load below a threshold load, a throttle position less than a threshold opening amount, brake pedal depression greater than a threshold amount, and accelerator depression less than a threshold accelerator depression amount. When operating in an autonomous mode, idle conditions may be determined based on one or more of one or more of engine speed, vehicle speed, engine load, and throttle position.

Upon confirming idle conditions, method 500 proceeds to 504. At 504, method 500 includes adjusting idle operation based on reduced NVH constraints for improved fuel economy benefits while compromising NVH.

In one example, adjusting idle operation includes, at 506, operating the vehicle in VDE mode during idle conditions. Operating the vehicle in VDE mode includes, at 508, determining a desired number of cylinders and desired combination of cylinders to deactivate. The desired number of cylinders and the desired combination of cylinders may be based on achieving improved fuel economy while compromising driveline NVH. For example, during idle conditions, the vehicle may operate in a reduced displacement mode where a minimum number of cylinders are operated with maximum power output. Since the vehicle is operating with zero occupants, the torque pulsations or disturbances generated by cylinder firings, which may be transmitted through the chassis and cause noise and vibration within the vehicle cabin may not limit the use of VDE mode of operation. Upon determining the number of cylinders and the desired combination of cylinders to deactivate during idle, method 500 includes, at 510, deactivating the number of cylinders by deactivating one or more of intake valves, exhaust valves, spark, and fuel injection. For example, the controller may deactivate the number of cylinders via one or more of intake valve actuator, exhaust valve actuator, spark plug actuator, and fuel injector actuator.

In this way, during idle or near idle conditions, when no occupants are present, by operating the vehicle in VDE mode and choosing the number of cylinders to deactivate during the VDE mode based on improved fuel economy benefits and reduced NVH constraints, fuel economy may be improved by compromising NVH.

Further, at 512, a spark timing on the active cylinders may be retarded. A degree of retard may be based on improved fuel economy and reduced NVH constraints. For example, an amount of spark retard may be reduced in order to achieve improved fuel economy.

In one example, during a first condition, when one or more occupants are present within the vehicle, VDE operation may be disabled during idle conditions in order to improve drivability; and during a second condition, when zero occupants are present in the vehicle and the vehicle is operating in an autonomous mode, the engine may be operated in the VDE mode in order to improve fuel economy while compromising drivability.

Figure 6A:
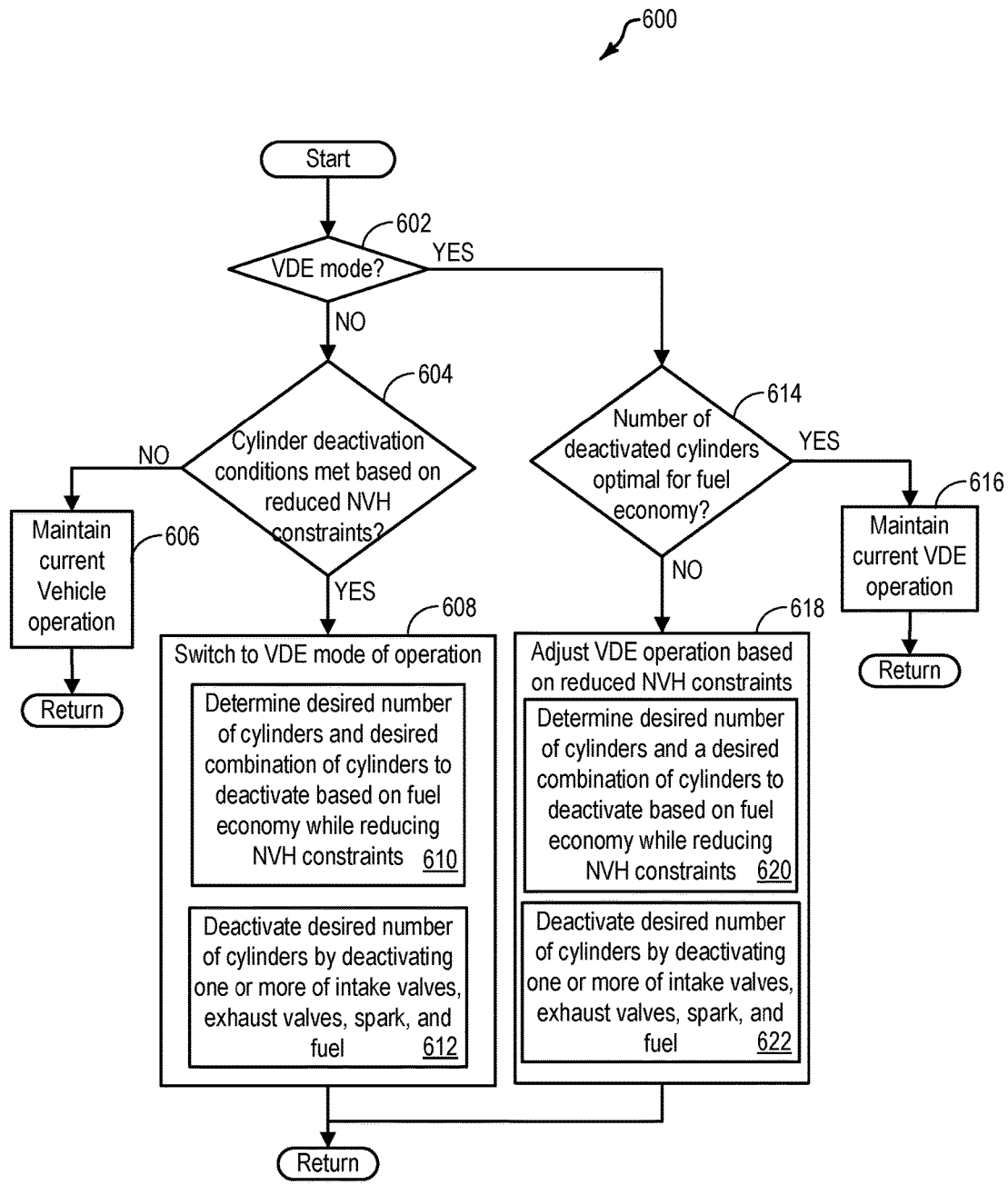
FIG. 6A shows a flowchart illustrating an example method for controlling variable displacement engine (VDE) operation of the vehicle when zero occupants are detected, to be used in conjunction with the method of FIG. 3.

Turning to FIG. 6A, an example method 600 is shown for adjusting a VDE mode of engine operation during conditions when zero occupants are present in the vehicle. Specifically, operating range of VDE mode may be expanded when zero occupants are present in the vehicle to improve fuel economy. Method 600 may be performed in coordination with method 300 at FIG. 3. Method 600 will be described herein with reference to the components and systems depicted in FIGS. 1A, 1B, and 2, though it should be understood that the method may be applied to other systems without departing from the scope of this disclosure. Instructions for carrying out method 600 may be executed by a controller, such as controller 12 at FIGS. 1A, 1B, and 2, based on instructions stored in non-transitory memory of the controller, and in conjunction with signals received from sensors of the vehicle system, such as the sensors described above with reference to FIGS. 1A, 1B, and 2. The controller may employ actuators of the vehicle system, such as the actuators described with reference to FIGS. 1A, 1B, and 2, to adjust vehicle operation based on number of occupants. In particular, the controller may adjust VDE operation based on reduced NVH constraints by adjusting one or more of an intake valve, an exhaust valve, spark timing, and fuel injection, to deactivate one or more engine cylinders during VDE mode, via one or more of an intake valve actuator, an exhaust valve actuator, a spark plug actuator, and a fuel injector actuator, to increase fuel economy while compromising NVH when zero occupant are detected, according to the method 600 described below.

Method 600 begins at 602. At 602, method 600 includes judging if the vehicle is operating in a VDE mode. For example, the vehicle may be confirmed operating in the VDE mode if a number of cylinders are deactivated and a remaining number of cylinders are operating. Deactivation of the cylinders may be determined based on the states of one or more of intake valve, exhaust valve, fuel injectors, and spark plug. If the answer at 602 is YES, the vehicle is operating in the VDE mode, and method 600 proceeds to 614.

If the answer at 602 is NO, the vehicle is not operating in the VDE mode, and method 600 then proceeds to 604. At 604, method 600 includes determining if cylinder deactivation conditions are met based on reduced NVH constraints. For example, the vehicle and/or engine operating conditions may be measured and/or estimated. Further, reduced NVH constraints may be applied, the controller may determine if it is desirable to operate the vehicle in the VDE mode based on the reduced NVH constraints. For example, at near-idle or idle speed conditions, when nominal NVH constraints are applied, for smoother drive and better feel, VDE operation may be disabled. However, operating the vehicle in the VDE mode during idle or near-idle conditions may improve fuel economy. Therefore, when no occupants are present in the vehicle and the vehicle is operating in an autonomous mode, NVH constraints may be reduced and engine operation that favors fuel economy to NVH may be selected. Accordingly, at 604, method 600 includes determining if VDE operation is desired for improved fuel economy while compromising NVH. For example, one or more thresholds may be adjusted, such as engine speed and load thresholds within which VDE operation may be performed, and the controller may determine, based on the adjusted threshold, if VDE operation is desired after applying reduced NVH constraints.

The one or more thresholds may include a first threshold for a number of cylinders that may be deactivated during the VDE operation. For example, responsive to reduced NVH constraints the first threshold for the number of cylinders that may be deactivated may be increased.

The one or more thresholds that may be adjusted based on reduced NVH constraints may further include a second threshold for engine speed below which VDE operation may be disabled. For example, responsive to NVH constraints the second threshold for engine speed may be decreased such that VDE operation may be enabled during engine idle conditions or near idle conditions. In this way, operation of the engine in reduced displacement mode may not be limited during idle or near idle conditions when reduced NVH constraints are employed, thereby improving fuel economy.

The one or more thresholds that may be adjusted based on reduced NVH constraints may further include a third threshold for a number of gears or gear ratios during which VDE operation may be enabled. For example, current transmission gear or gear ratio may be used in determining whether to operate in a reduced displacement mode. Typically, when nominal NVH constraints are employed, operation in VDE mode may be disabled during vehicle operation in first and/or second gear. However, when reduced NVH constraints are employed, depending or torque requirements, VDE mode operation in the first and/or second gear may not be disabled. Thus, if torque requirements are satisfied, the engine may be allowed to operate in the VDE mode when the current transmission ratio is in the first gear and/or the second gear in order to improve fuel economy.

In this way, VDE operation boundary may be expanded to improve fuel economy while compromising NVH when zero occupants are present.

Returning to 604, if it is confirmed that cylinder deactivation conditions are met (that is, if VDE mode of engine operation is desired) based on reduced NVH constraints, method 600 proceeds to 608. At 608, method 600 includes switching to VDE mode of operation, and operating the engine in the VDE mode. Switching to VDE mode of operation and operating the engine in the VDE mode is discussed at FIG. 5, steps 508 and 510. Briefly, a number of cylinders to deactivate and the desired combination of cylinders to deactivate are determined based on improved fuel economy while employing reduced NVH constraints. Next, the number of cylinders is deactivated by deactivating one or more of intake valves, exhaust valves, spark, and fuel injection.

Returning to 602, if it is determined that the vehicle is operating in the VDE mode when zero occupants are present in the vehicle, method 600 proceeds to 614. At 614, method 600 includes determining if the number of deactivated cylinders is optimal for fuel economy. For example, a look up table including a desired number of deactivated cylinders for fuel economy while compromising NVH constraints (such as when zero occupants are present within the vehicle), and a desired number of deactivated cylinders for drivability (such as when one or more occupants are present within the vehicle) at different speed and load conditions may be stored in a memory of the controller. At 614, method 600 may compare a current number of deactivated cylinders with the desired number of deactivated cylinders for fuel economy. In one example, the desired number of deactivated cylinders for fuel economy may be greater than the desired number of deactivated cylinders for drivability. Thus, a smaller number of cylinders may be deactivated when drivability is preferred over fuel economy; and a larger number of cylinders may be deactivated when fuel economy is preferred over fuel economy. Thus, at 614, if the current number of deactivated is not equal to the desired number of deactivated cylinders for fuel economy, the vehicle is not operating at desired fuel economy. Accordingly, method 600 proceeds to 618. At 618, method includes adjusting VDE operation for improved fuel economy while compromising NVH. Adjusting VDE operation for improving fuel economy includes, at 620, determining a desired number of cylinders and a desired combination of cylinders to deactivate based on improved fuel economy and reduced NVH constraints. For example, the look-up table as discussed above may be utilized to determine the desired number of cylinders for fuel economy. Adjusting VDE operation further includes, at 622, deactivating desired number of cylinders by deactivating one or more of intake valves, exhaust valves, spark, and fuel injection. For example, if the current number of deactivated cylinders if less than the desired number of deactivated cylinders for fuel economy, the difference number of cylinders (that is, desired number minus current number) may be deactivated.

In this way, the number of cylinders deactivated may be adjusted for optimal fuel economy by reducing NVH constraints.

Returning to 614, if the current number of deactivated cylinders is equal to the desired number of deactivated cylinders for fuel economy, the vehicle is operating at desired fuel economy. Accordingly, method 600 proceeds to 616. At 616, method includes maintaining current VDE operation.

While the present examples illustrate controlling VDE mode of operation independent of other operations, it will be appreciated that during conditions when reduced NVH constraints are employed, VDE operation may be controlled in coordination with one or more other vehicle operations, such as torque converter operation, EGR operation etc.

Figure 6B:
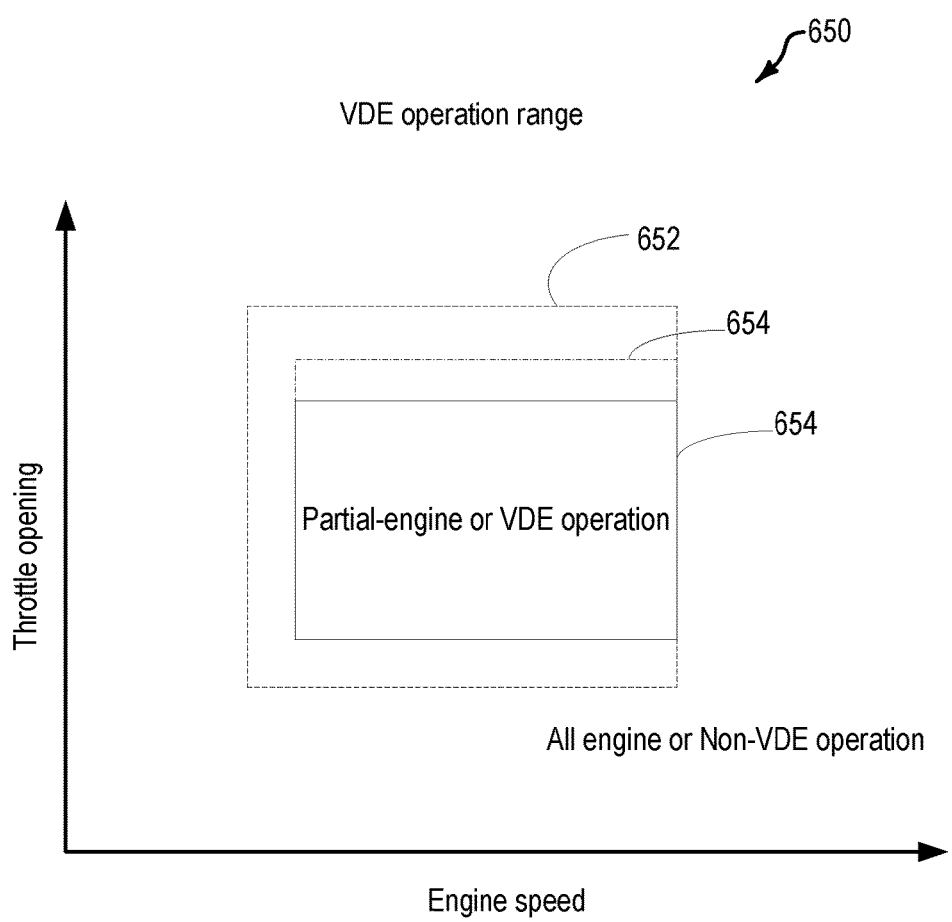
FIG. 6B shows a graph illustrating an example operating range of VDE when zero occupants are detected.

FIG. 6B illustrates a graph showing operating range of VDE based on different NVH constraints. The VDE operation is plotted against throttle opening and engine speed.

Rectangular boundary 656 indicates an example VDE operating range when nominal NVH constraints are applied. For example, when one or more occupants are present, nominal NVH constraints may be applied, VDE operation may be restricted to mid-range speeds, at low and/or moderate loads. Rectangular boundary 652 indicates an example operating range when first reduced NVH constraints are applied. For example, when zero occupants are present, first reduced NVH constraints may be applied, VDE operation may be expanded to lower speed and higher loads (e.g., indicated by larger throttle opening). Rectangular boundary 654 indicates an example operating range when second reduced NVH constraints are applied. For example, when one or more occupants are present, and a vehicle operator selects a preference for fuel economy over NVH (e.g., via a driver interface), second reduced NVH constraints may be applied. When second reduced constraints are applied, VDE operation may be expanded to range more than nominal NVH constraints, but less than when first reduced NVH constraints are applied.

Figure 7A:
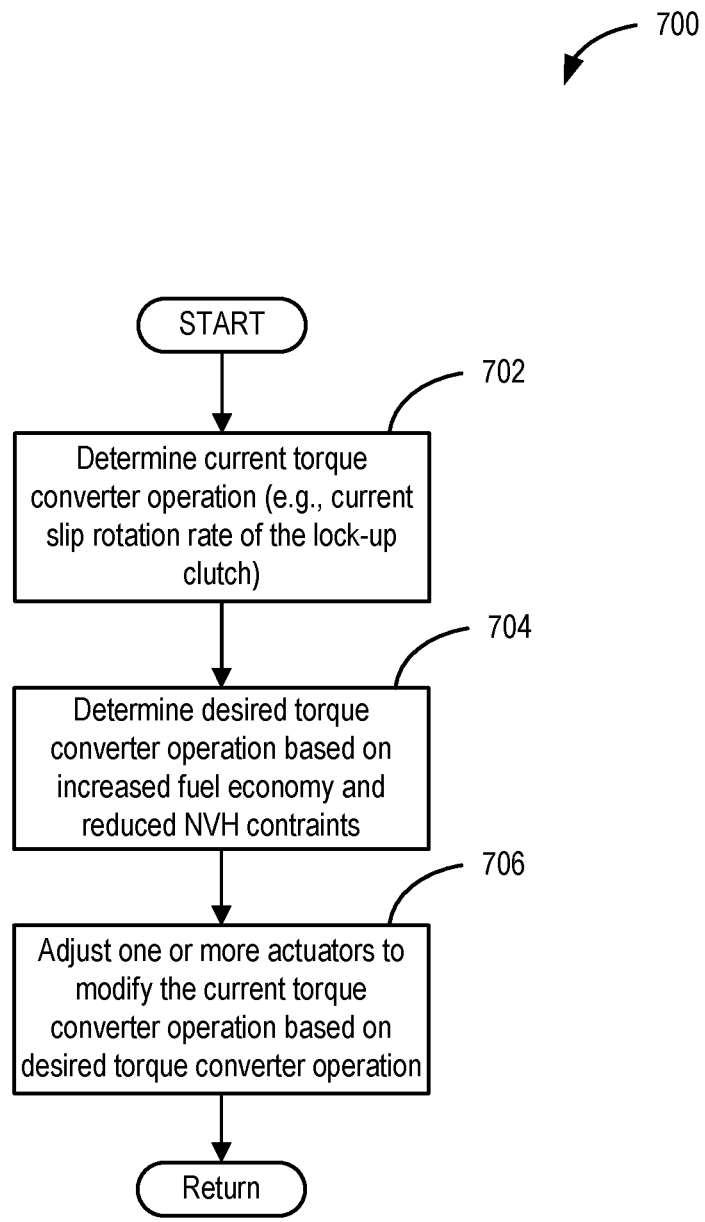
FIG. 7A shows a flowchart illustrating an example method for controlling torque converter operation of the vehicle when zero occupants are detected, to be used in conjunction with the method of FIG. 3.
Figure 7B:
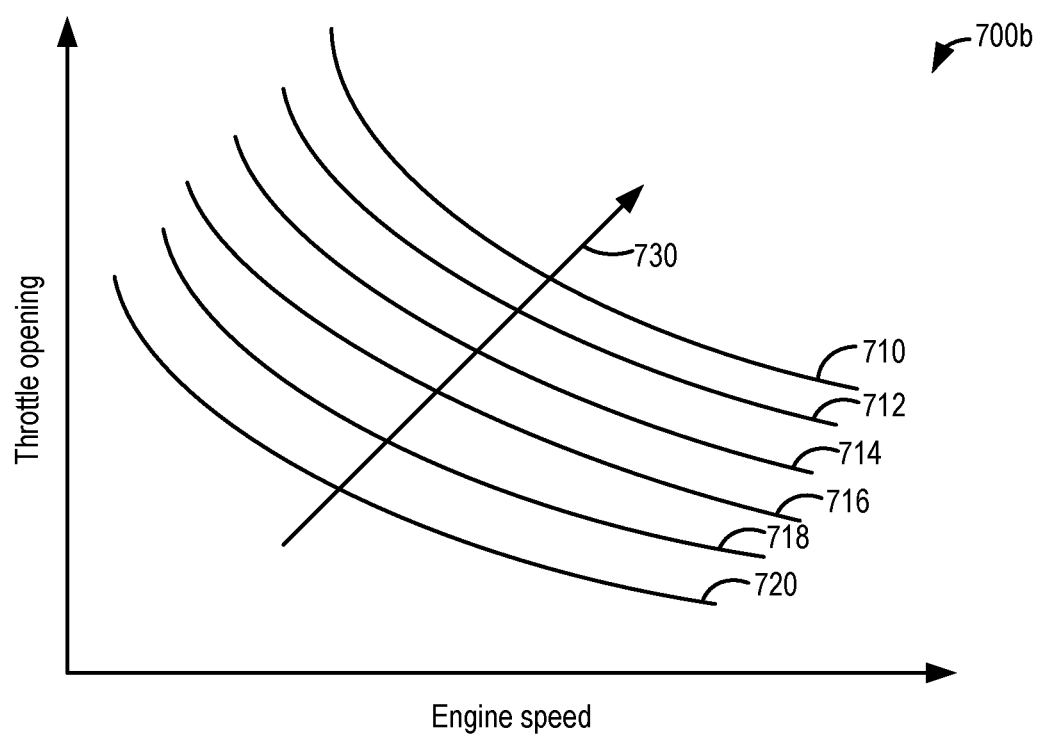
FIG. 7B shows a graph illustrating an example adjustment of a torque converter slip schedule responsive to detecting zero occupants in the vehicle.

Turning to FIG. 7A, a flow chart illustrating an example method 700 for adjusting torque converter operation based on increased fuel economy while compromising drivability is shown. Specifically, method 700 may be performed in response to determining that zero occupants are present in the vehicle during vehicle operation. Method 700 may be performed in coordination with method 300 at FIG. 3. Method 700 will be described herein with reference to the components and systems depicted in FIGS. 1A, 1B, and 2, though it should be understood that the method may be applied to other systems without departing from the scope of this disclosure. Instructions for carrying out method 700 may be executed by a controller, such as controller 12 at FIGS. 1A, 1B, and 2, based on instructions stored in non-transitory memory of the controller, and in conjunction with signals received from sensors of the vehicle system, such as the sensors described above with reference to FIGS. 1A, 1B, and 2. The controller may employ actuators of the vehicle system, such as the actuators described with reference to FIGS. 1A, 1B, and 2, to adjust vehicle operation based on number of occupants. In particular, the controller may adjust operation of a torque converter, such as torque converter 206 at FIG. 2, based on reduced NVH constraints via a torque converter actuator to increase fuel economy while compromising NVH when zero occupant are detected, according to method 700 described below.

Method 700 begins at 702. At 702, method 700 includes determining current torque converter operation. For example, at 702, determining current torque converter operation includes determining a current slip rotation rate of the lock-up clutch. The current slip rotation rate may be determined based on one or more of an impeller speed of the torque converter, a turbine speed of the torque converter, and a duty cycle of a lock-up clutch solenoid.

Upon determining the current slip rotation rate, method 700 proceeds to 704. At 704, method 700 includes determining a desired torque converter operation. For example, at 704, determining the desired torque converter operation includes shifting to a map for controlling torque converter operation that corresponds to zero occupants in the vehicle. The map may include a torque converter schedule for an operational range of speed and load that favors fuel economy over NVH (that is, drivability). Thus, for a give speed and load, the desired torque converter slip rotation rate may be determined based on the map that corresponds to zero occupants in the vehicle, the desired slip rotation rate favoring fuel economy over NVH. The map may be stored in the memory of the controller, and may be utilized for determining the desired slip rotation rate in response to the controller confirming that zero occupants are present within the vehicle. An example torque converter slip schedule or map is shown in FIG. 7B. Specifically, FIG. 7B illustrates directionality of shift in the torque converter slip map when zero occupants are present in the vehicle. Thus, the map that corresponds to zero occupants in the vehicle may be shifted as indicated in FIG. 7B.

In the example map illustrated in FIG. 7B, torque converter slip is mapped against throttle opening and engine speed. Line 710 represents 100% desired slip for the torque converter while line 720 represents 0% desired slip for the torque converter. The desired slip is 0% when engine operation falls on line 720 and torque converter is in a locked state. The desired slip is 100% when engine operation falls on line 710 and the torque converter is in a locked state. However, between lines 710 and 720, torque converter may be in a partially locked state. For example, lines 712, 714, 716, and 718 represent 80%, 60%, 40% and 20% slip respectively. In the partially locked state, the torque converter may be commanded to achieve the desired slip based on engine speed and load conditions.

The torque converter map may be adjusted based on a number of occupants in the vehicle. For example, when zero occupants are present in the vehicle, torque converter map may be adjusted such that fuel economy is favored over NVH and drivability. Consequently, the torque converter map may be shifted in the direction indicated by arrow 730. Thus, the map corresponding to zero occupants in the vehicle is adjusted towards less slip. The decrease in slip may favor fuel economy by decreasing torque loss during torque conversion. However, decrease in slip decreases fluidic coupling, which lessens the dampening effect of torque fluctuations. As a result, drivability may be decreased. However, since there are zero occupants in the vehicle, concern for drivability may be compromised for fuel economy improvement.

The shifting of the torque converter map to the map corresponding to zero occupants may be performed based on NVH tolerance limits. Specifically, the NVH tolerance limits may be increased when zero occupants are present. Therefore, a degree of shift towards less slip may be based on increase in the NVH tolerance limits.

As discussed above, the desired slip rotation rate when zero occupants are present in the vehicle may be based on achieving a better fuel economy while compromising drivability. For example, for a given engine speed and load, the desired slip rotation rate when zero occupants are present may be less than a slip rotation rate when one or more occupants are present in the vehicle.

Upon determining the desired slip rotation rate, method 700 proceeds to 706. At 706, method 700 includes adjusting one or more actuators to modify current torque converter operation based on desired torque converter operation. For example, responsive to determining zero occupants in the vehicle, for current engine speed and load, the desired slip may be less than the current slip. Therefore, the controller, upon determining the desired slip, may send signals to a lock-up clutch actuator to decrease the slip of the lock-up clutch such that a target engagement state (and hence desired slip) of the lock-up clutch is achieved.

Upon achieving the desired slip, method 700 may return.

In some examples, method 700 may be performed in response to an occupant-selected mode wherein the occupant chooses to operate the vehicle for increased fuel economy while compromising drivability. Thus, the lock-up clutch operation may be modified based on an occupant-selected setting. Specifically, the controller may modify the lock-up clutch operation based on the occupant selected setting received from a vehicle interface. For example, when an occupant selects a setting that favors improved fuel economy over NVH, the controller may decrease the desired slip of the torque converter. The desired slip may be determined based on a map that is adjusted towards less slip when occupant favors fuel economy. On the other hand, when the occupant selects a setting that favors improved NVH, the controller may increase the desired slip of the torque converter. In this case, the desired slip may be determined based on a map that is adjusted towards more slip when occupant favors drivability.

In one example, when operating in the occupant-selected mode, one or more occupants may be present in the vehicle. When one or more occupants are present in the vehicle and the occupant selects a mode that favors fuel economy, the controller may use a map that corresponds to the occupant-selected mode favoring fuel economy and therefore, adjusted towards less slip. However, since one or more occupants are present in the vehicle, a threshold NVH limit may be less than when zero occupants are present in the vehicle. Therefore, when one or more occupants are present in the vehicle and operating in the occupant-selected mode favoring fuel economy, for a given speed and load, the desired slip may be greater than the desired slip when zero occupants are present but less than when drivability is preferred.

It will be appreciated that examples where the desired slip when zero occupants are present is same as the desired slip when one or more occupants are present and operating in occupant-selected fuel economy mode are also within the scope of the disclosure.

Figure 8A:
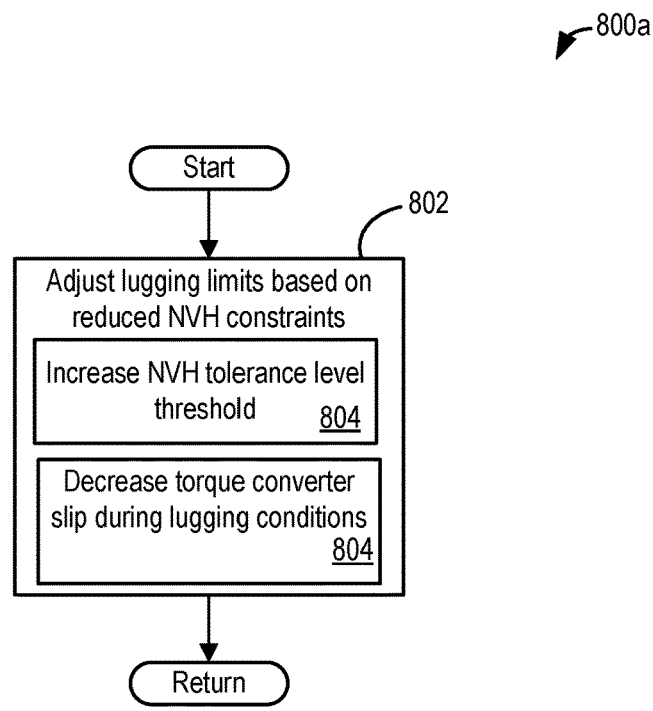
FIG. 8A shows a flowchart illustrating an example method for controlling noise vibration and harshness (NVH) of the vehicle during lugging conditions when zero occupants are detected, to be used in conjunction with the method of FIG. 3.
Figure 8B:
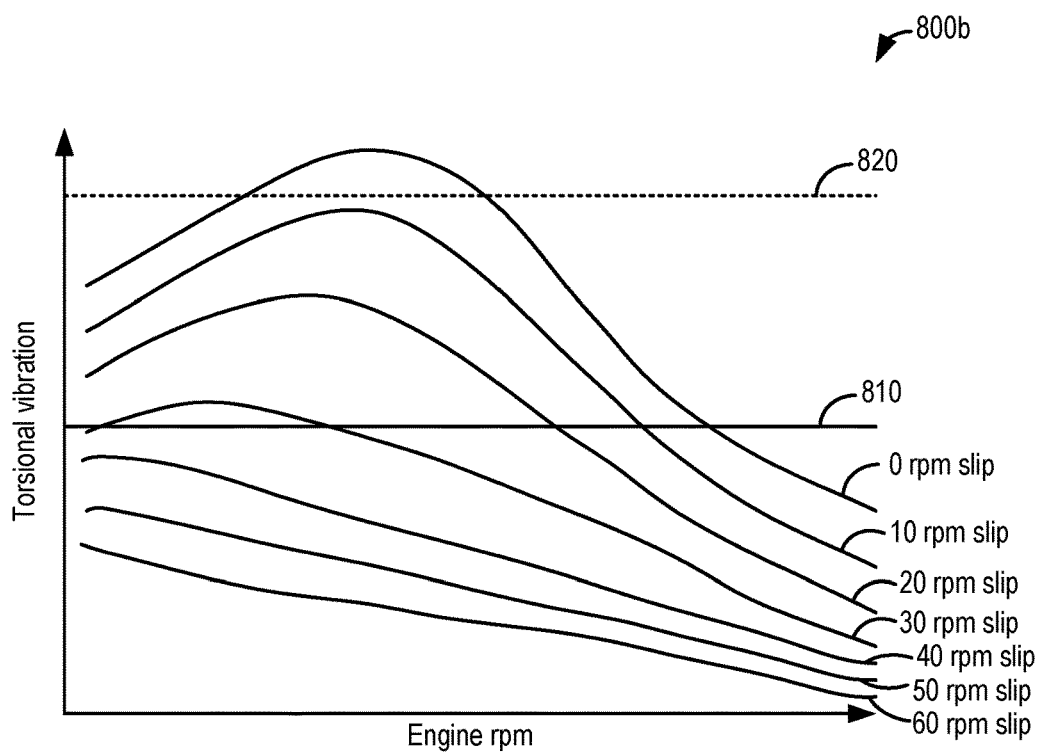
FIG. 8B shows a graph illustrating an example adjustment of lugging NVH thresholds based on number of occupants within the vehicle.

Turning to FIG. 8A, an example method 800 for adjusting lugging limits of the engine is shown. Specifically, method 800 may be performed in response to determining that zero occupants are present in the vehicle. Lugging may be referred to a condition that occurs when the vehicle is operating in high gear with a lower engine speed (e.g., below 2000 rpm). When vehicle acceleration is desired under these conditions, the engine may generate less torque and hence, may struggle to give the desired motion to the vehicle. Thus, the acceleration is low. Due to high load and low engine speeds, firing frequency is low which causes driveline disturbances. Such driveline vibrations may be experienced by the vehicle occupants as one or more of seat track vibration, steering wheel vibration, and interior cabin boom sound. Typically, NVH due to lugging may be controlled through torque converter, which transmits and amplifies torque from the engine to the transmission using fluid coupling. For example, torque converter slip may be increased during lugging conditions in order to dampen the effect of vibrations produced during lugging. In this way, drivability is improved. However, increasing torque converter slip decreases fuel economy due to fluid coupling and clutch friction. Therefore, when zero occupants are present in the vehicle, NVH due to lugging may be tolerated in order to increase fuel economy. Method 800 illustrates adjustment of lugging NVH tolerance limits and torque converter operation so that during lugging fuel economy is favored over drivability when zero occupants are present in the vehicle. Method 800 may be performed in coordination with method 300 at FIG. 3. Method 800 will be described herein with reference to the components and systems depicted in FIGS. 1A, 1B, and 2, though it should be understood that the method may be applied to other systems without departing from the scope of this disclosure. Instructions for carrying out method 800 may be executed by a controller, such as controller 12 at FIGS. 1A, 1B, and 2, based on instructions stored in non-transitory memory of the controller, and in conjunction with signals received from sensors of the vehicle system, such as the sensors described above with reference to FIGS. 1A, 1B, and 2. The controller may employ actuators of the vehicle system, such as the actuators described with reference to FIGS. 1A, 1B, and 2, to adjust vehicle operation based on number of occupants. In particular, the controller may adjust torque converter operation based on reduced NVH constraints via a torque converter actuator to increase fuel economy while compromising NVH when zero occupant are detected, according to the method 800 described below.

Method 800 begins at 802. At 802, method 800 includes adjusting lugging limits, specifically, lugging NVH tolerance limits, based on reduced NVH constraints. Adjusting lugging limits includes, at 804, increasing an NVH tolerance threshold. Adjusting lugging limits further includes, at 806, decreasing torque converter slip during lugging conditions. An example map illustrating torsional vibration at transmission output over engine rpm at various slip rpm is shown in FIG. 8B. Line 810 indicates lugging limit when one or more occupants are present in the vehicle, and line 820 indicated adjusted lugging limit when zero occupants are present in the vehicle. Typically, when one or more occupants are present in the vehicle, lugging limit may be set as indicated by line 810. During such conditions, at lower engine speeds, torque converter slip of 30 rpm or lower would fail to meet the desired NVH target. Thus, vehicle may not be operated with a torque converter slip of 30 or less in order to meet desired NVH level and maintain drivability. In other words, torque converter operation is adjusted such that desired NVH levels are maintained during lugging. However, a higher torque converter slip that favors drivability may decrease fuel economy. Therefore, when zero occupants are present in the vehicle, the lugging NVH tolerance limit may be increased (as indicated by line 820) in order to allow the torque converter operation at lower slip, which improves fuel economy while compromising NVH. Map 800*b* may be stored in the memory of the controller and may be used to select a torque converter map corresponding to increased NVH tolerance limits, which may be used to determine the desired slip during engine conditions, such as lugging depending on the number of occupants present in the vehicle.

In this way, when zero occupants are present in the vehicle, NVH tolerance limits may be increased so that during lugging conditions torque converter slip may be decreased to increase fuel economy while compromising drivability.

Figure 9:
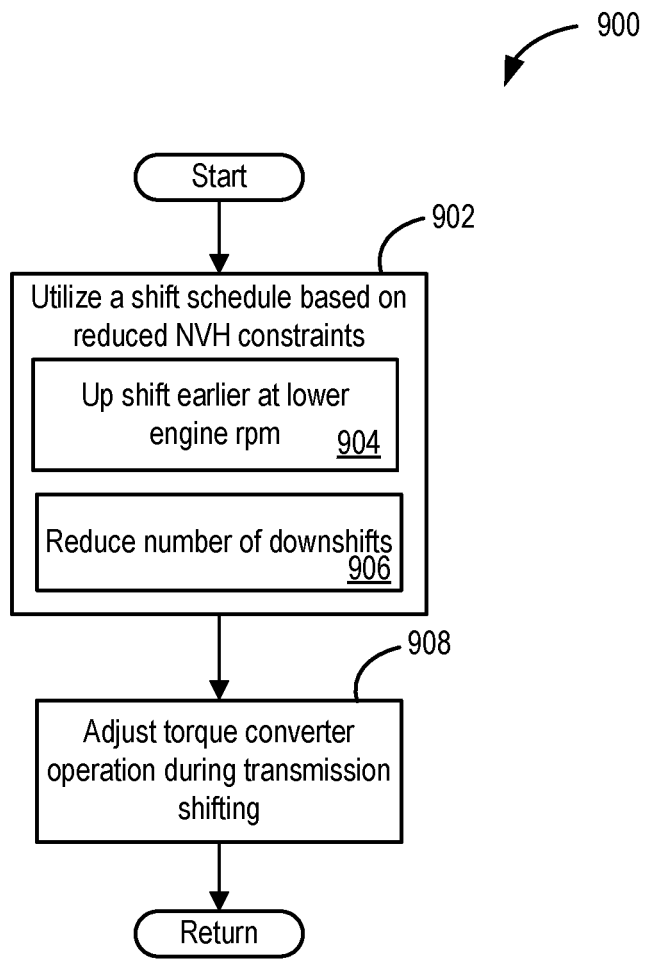
FIG. 9 shows a flowchart illustrating an example method for controlling a transmission shift schedule when zero occupants are detected, to be used in conjunction with the method of FIG. 3.

Next, FIG. 9 shows a flow chart illustrating an example method 900 for adjusting transmission shifting based on reduced NVH constraints. Specifically, method 900 may be performed in response to determining zero occupants are present in the vehicle. Method 900 may be performed in coordination with method 300 at FIG. 3. Method 900 will be described herein with reference to the components and systems depicted in FIGS. 1A, 1B, and 2, though it should be understood that the method may be applied to other systems without departing from the scope of this disclosure. Instructions for carrying out method 900 may be executed by a controller, such as controller 12 at FIGS. 1A, 1B, and 2, based on instructions stored in non-transitory memory of the controller, and in conjunction with signals received from sensors of the vehicle system, such as the sensors described above with reference to FIGS. 1A, 1B, and 2. The controller may employ actuators of the vehicle system, such as the actuators described with reference to FIGS. 1A, 1B, and 2, to adjust vehicle operation based on number of occupants.

Method 900 begins at 902. At 902, method 900 includes utilizing a transmission shift schedule based on reduced NVH constraints. Specifically, upshift and downshift decisions may be based on reduced NVH constraints. The transmission shift schedule based on reduced NVH constrains favors fuel economy, and includes at 904, upshifting early at lower engine rpm, and at 906 reducing the number of downshifts.

Next, at 908, method 900 includes adjusting torque converter operation during transmission shifting. When one or more occupants are present, the torque converter may operate with the lock-up clutch in an unlocked state for smoother shifting. After the shift is completed, depending on the engine speed and load, the lock-up clutch may be changed to a locked position. In the unlocked state, due to fluidic coupling, there is loss in fuel economy. Further, shifting between locked and unlocked states also add to fuel economy penalty. Therefore, when zero occupants are present in the vehicle, the need for smoother shifting may be compromised and the torque converter may be operated so as to improve fuel economy. Accordingly, in one example, the torque converter clutch may be adjusted to a locked position during transmission shifting. In another example, during transmission shifting, the torque converter clutch may be maintained in a previous state (which may be locked or unlocked) before the transmission shifting.

In yet another example, transmission clutch slippage during shifting also may be used and controlled based on the number of occupants. For example, transmission clutch slippage during gear shifts may be used to provide an occupant with a sensation of smoother gear shifts. When an occupant is not present, transmission clutch slippage may be decreased to improve fuel economy.

In this way, transmission shifting may be adjusted for improved fuel economy while compromising NVH.

Figure 10:
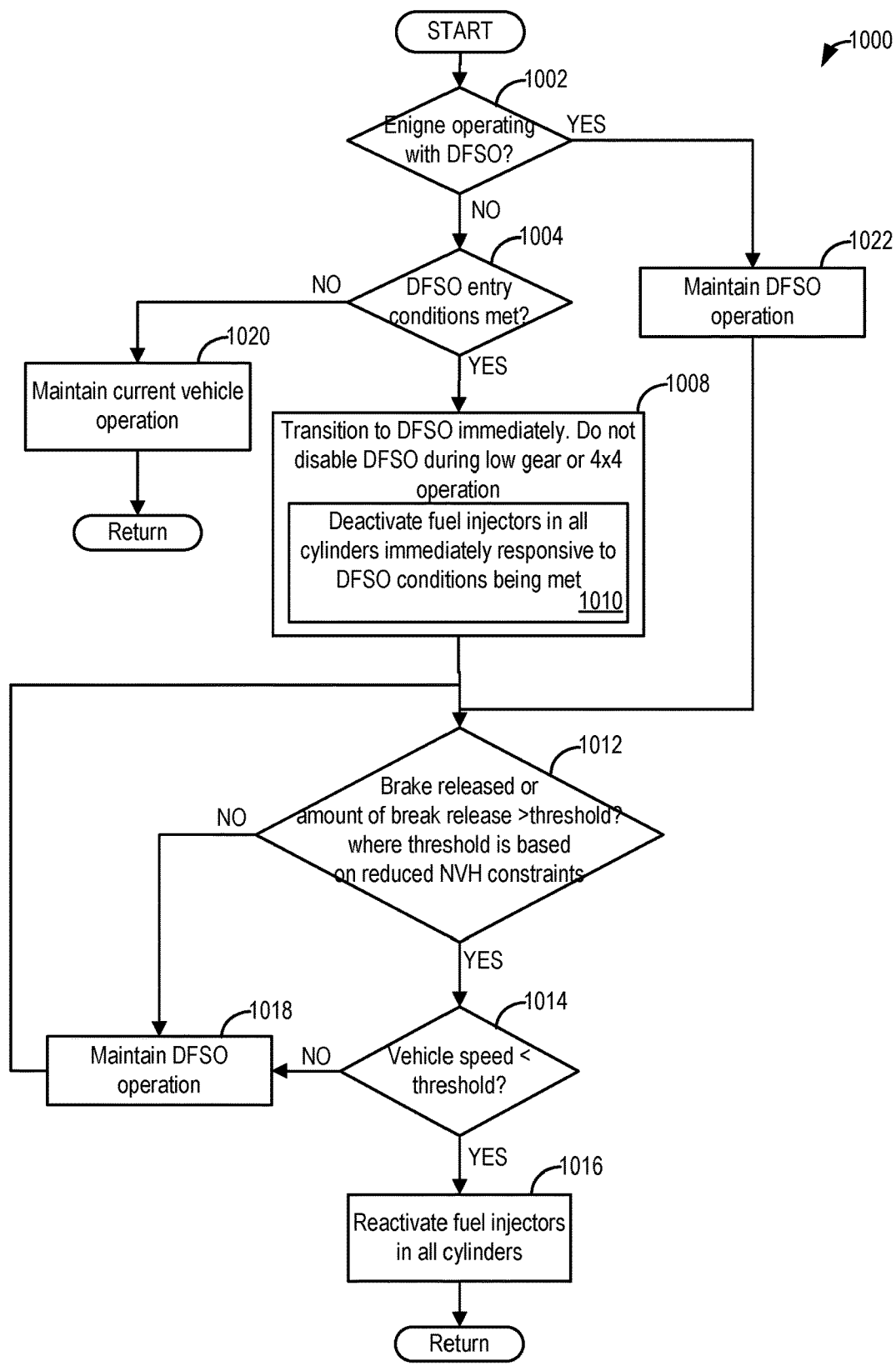
FIG. 10 shows a flowchart illustrating an example method for controlling deceleration fuel shut off (DFSO) operation of the when zero occupants are detected, to be used in conjunction with the method of FIG. 3.

Turning next to FIG. 10, a flow chart illustrating an example method 1000 for adjusting DFSO operation based on reduced NVH constraints is shown. Method 1000 may be performed in response to determining zero occupants are present within the vehicle and the vehicle is operating in an autonomous mode. Method 1000 may be performed in coordination with method 300 at FIG. 3. Method 1000 will be described herein with reference to the components and systems depicted in FIGS. 1A, 1B, and 2, though it should be understood that the method may be applied to other systems without departing from the scope of this disclosure. Instructions for carrying out method 1000 may be executed by a controller, such as controller 12 at FIGS. 1A, 1B, and 2, based on instructions stored in non-transitory memory of the controller, and in conjunction with signals received from sensors of the vehicle system, such as the sensors described above with reference to FIGS. 1A, 1B, and 2. The controller may employ actuators of the vehicle system, such as the actuators described with reference to FIGS. 1A, 1B, and 2, to adjust vehicle operation based on number of occupants. In particular, the controller may adjust DFSO operation based on reduced NVH constraints by adjusting operation of a fuel injector, such as fuel injector 69 at FIG. 2, via a fuel injector actuator, to increase fuel economy while compromising NVH when zero occupant are detected, according to the method 1000 described below.

Method 1000 begins at 1002. At 1002, method 1000 includes judging if the engine is operating under deceleration fuel shut off (DFSO) conditions. DFSO condition is a non-fueling condition during which fuel supply is interrupted but the engine continues spinning and at least one intake valve and one exhaust valve are operating; thus, air is flowing through one or more of the cylinders, but fuel is not injected in the cylinders. Under DFSO conditions, fuel injector is deactivated, and combustion is not carried out and ambient air may move through the cylinder from the intake passage to the exhaust passage. Accordingly, DFSO conditions may be confirmed based on fuel injector deactivation in one or more, or all engine cylinders in addition to one or more of vehicle speed, throttle position, engine speed, and engine load. If DFSO conditions are confirmed, the answer at 1002 is YES, and method 1000 proceeds to 1022 to maintain DFSO operation.

If the engine is not currently operating with DFSO, method 1000 proceeds to 1004 to determine if the engine is operating under conditions in which DFSO is desired. DFSO may be initiated responsive to one or more of vehicle speed, vehicle acceleration, engine speed, engine load, throttle position, and transmission gear position, and may occur repeatedly during a drive cycle. In one example, DFSO may be initiated if engine speed is below a threshold speed. In another example, DFSO may be initiated if engine load is below a threshold. In still another example, when operating in an autonomous mode, DFSO may be initiated based on an a throttle position and/or a change in the throttle position for a suitable duration—e.g., DFSO may be initiated if a threshold change in the throttle position indicating deceleration request has occurred. Additionally or alternatively, DFSO may be initiated if the vehicle has remained in deceleration conditions (e.g., throttle remaining in a threshold open position) for a threshold duration. Further, additionally or alternatively, entry into DFSO may be determined based on a commanded signal to cease fuel injection.

If DFSO entry conditions are not met, the answer at 1004 is NO, and method 1000 proceeds to 1020. At 1020, method 1000 includes maintaining current vehicle operation. If DFSO entry conditions are met, the answer at 1004 is YES, and method 1000 proceeds to 1008.

At 1008, method 1000 includes transitioning to DFSO operation immediately. For example, poor drivability may become an issue during deceleration fuel shut off (DFSO). Specifically, poor drivability may result due to transmission or driveline gear lash. For example, when the engine transitions from exerting a positive torque to exerting a negative torque (or being driven), the gears in the transmission or driveline separate at the zero torque transition point. Then, after passing through the zero torque point, the gears again make contact to transfer torque. This series of events produces an impact, or clunk. Further, the effects of transmission gear lash can be amplified depending on the state of the transmission. For example, sensitivity to noise, vibration, and harness (NVH) may be higher in all wheel drive or 4×4 operation, compared with two-wheel drive operation. Further, such sensitivity may also be increased as the overall transmission gear is lower, such as to a 4×4 low gear. Therefore, in order to improve drivability, deactivation of the fuel injection during deceleration operation is restricted when the vehicle is in an all wheel drive, or 4×4, low gear. Further, clunk may be more perceptible or perceptible at certain vehicle speeds less than a clunk threshold. During such conditions as well, DFSO may be disabled. Further, deactivation of fuel injectors may be delayed until engine speed stabilizes in order to reduce NVH. However, limiting DFSO or delaying DFSO impacts fuel economy. Therefore, when zero occupants are present in the vehicle and the vehicle is operating autonomously, NVH may be tolerated largely and concern for drivability is reduced.

Thus, when zero occupants are present in the vehicle and the vehicle is operating in an autonomous mode, DFSO operation may be expanded to a wider range of operating conditions, and fuel injection deactivation may be performed immediately upon DFSO entry conditions being met. Specifically, DFSO may be performed during all wheel and/or low gear operation. Further, the clunk threshold may be decreased so that DFSO is performed at lower vehicle speeds. Further still, DFSO may be initiated immediately in response to entry conditions being met, without delaying DFSO until engine speed stabilizes. Further, performing DFSO includes, at 1010, deactivating fuel injection in all cylinders.

In this way, DFSO is performed more aggressively at a wider range of operating conditions, and without delay when zero occupants are present in the vehicle so that fuel economy is prioritized over drivability.

Next, method 1000 proceeds to 1012. At 1012, method 1000 includes determining if brake is released or if an amount of brake release is greater than a threshold, where the threshold is based on reduced NVH constraints. When zero occupants are present and the vehicle is operating autonomously, application of brakes may be determined based on brake pressure, for example.

When one or more occupants are present in the vehicle, in order to mitigate clunk and improve tip-in response, exit from DFSO may be performed early. Specifically, since it takes a certain duration (e.g., amount of time, or number of engine cycles) to re-enable engine firing, a driver may easily feel clunk on exit of DFSO if the injectors, combustion, transmission control and engine torque control do not have adequate time to stabilize. Thus, a driver's tip-in may be anticipated so as to prepare torque control prior to the tip-in event by making use of the brake input and effort. In this way, the engine is given sufficient time to prepare the reactivation of fuel injection. Thus, the engine may provide required torque once the driver tip-in and powertrain NVH may be reduced. However, when zero occupants are present within the vehicle, NVH constraints are reduced and fuel economy is prioritized. Thus, exit from DFSO may not be performed early. Accordingly, the threshold amount brake release may be increased (that is, threshold amount of break release for DFSO exit when one or more occupants are present is less than threshold amount of brake release for DFSO exit when zero occupants are present) so that DFSO can be performed more aggressively for an extended amount of time with reduced NVH constraints. In this way, greater fuel economy may be achieved when zero occupants are present in the vehicle operating in an autonomous mode.

If the answer at 1012 is NO, method 1000 proceeds to 1018. At 1018, method 1000 includes maintain current DFSO operation. If the answer at 1012 is YES, method 1000 proceeds to 1014. At 1014, method 1000 includes determining if the vehicle speed is less than a low threshold speed, where the low threshold speed is based on reduced NVH constraints. For example, since a driver may feel clunk more easily at lower vehicle speeds, when one or more occupants are present, reactivation of fuel injection (that is, exit from DFSO) may be performed when vehicle speed is above a high threshold to improve drivability. However, when zero occupants are present, drivability may be compromised in order to improve fuel economy. Thus, reactivation of fuel injection may be performed when vehicle speed decreases to a low threshold, less than the high threshold. In this way, DFSO operation range may be extended to lower vehicle speeds due to reduced drivability concerns when zero occupants are present in the vehicle.

Accordingly, if it is confirmed that the vehicle speed is greater than the threshold low speed, method 1000 proceeds to 1018. At 1018, method 1000 includes maintaining current DFSO operation. If it is confirmed that the vehicle speed is at or below the threshold low speed, method 1000 proceeds to 1016 to reactivate all fuel injectors that were deactivated during DFSO. Method 1000 may then return.

In this way, DFSO operation thresholds may be adjusted with reduced NVH constraints when zero occupants are present such that DFSO operation range may be increased and greater fuel economy may be achieved.

As one embodiment, a method for operating a vehicle includes during an autonomous mode of vehicle operation, altering noise, vibration, and harshness (NVH) limits for a powertrain of the vehicle responsive to detecting zero occupants within the vehicle to improve fuel economy. A first example of the method includes wherein altering the NVH limits responsive to detecting zero occupants includes setting a higher NVH threshold with respect to a lower NVH threshold when one or more occupants are present in the vehicle, and adjusting one or more parameters of powertrain operation based on the higher NVH threshold. A second example of the method optionally includes the first example and further includes wherein the powertrain includes an engine coupled to a transmission through a torque converter and adjusting one or more parameters of the powertrain based on the higher NVH threshold includes adjusting one or more of an idle operation of the engine, a variable displacement engine (VDE) mode of engine operation, a torque converter slip, shut off fuel supplied to the engine during deceleration (DFSO) operation, and an exhaust gas recirculation percentage of recirculated exhaust gas and air inducted into the engine for combustion. A third example of the method optionally includes one or more of the first and second examples, and further includes wherein adjusting one or more powertrain parameters based on the higher NVH threshold further includes switching to the variable displacement engine (VDE) mode of engine operation during an idle condition, and increasing an amount of spark retard of spark applied to engine combustion during the idle condition. A fourth example of the method optionally includes one or more of the first through third examples, and further includes wherein adjusting one or more powertrain parameters based on the higher NVH threshold further includes during the VDE mode of engine operation, deactivating a number of cylinders of the engine based on the higher NVH threshold, the number of cylinders deactivated increasing with increase in NVH threshold. A fifth example of the method optionally includes one or more of the first through fourth examples, and further includes, wherein adjusting one or more powertrain parameters based on the higher NVH threshold further includes adjusting a desired torque converter slip based on the higher NVH threshold. A sixth example of the method optionally includes one or more of the first through fifth examples, and further includes, wherein the desired torque converter slip decreases as the NVH threshold increases. A seventh example of the method optionally includes one or more of the first through sixth examples, and further includes, adjusting NVH limits during lugging conditions of the engine. An eighth example of the method optionally includes one or more of the first through seventh examples, and further includes wherein adjusting NVH limits during the lugging conditions includes decreasing torque converter slip during the lugging conditions, a percentage of decrease in torque converter increasing with increase in NVH limits. A ninth example of the method optionally includes one or more of the first through eighth examples, and further includes, wherein adjusting one or more powertrain parameters based on the higher NVH threshold includes, responsive to a deceleration greater than a threshold, transitioning immediately to a deceleration fuel shut off (DFSO) operation during which fuel supplied to an engine of the powertrain for combustion is shut off, where the threshold is based on the higher NVH limit. A tenth example of the method optionally includes one or more of the first through ninth examples, and further includes, wherein adjusting one or more parameters based on the higher NVH threshold includes delaying exit from a deceleration fuel shut off (DFSO) operation where fuel supplied to an engine of the powertrain is shut off; and wherein delaying exit from DFSO includes decreasing a vehicle speed threshold below which deactivated fuel injectors are reactivated.

As another embodiment, a method for operating a vehicle, includes setting different noise vibration and harshness (NVH) limits for a vehicle powertrain based on one or more of a number of occupants detected within the vehicle and an occupant-selected setting selected by an occupant through a vehicle interface. A first example of the method includes wherein altering the NVH limits includes responsive to detecting zero occupants setting a first higher NVH tolerance threshold, and adjusting one or more operating parameters of the vehicle based on the first higher NVH threshold. A second example of the method optionally includes the first example and further includes wherein altering the NVH limits includes responsive to detecting one or more occupants setting a second lower NVH tolerance threshold, and adjusting one or more operating parameters of the vehicle based on the second lower NVH threshold. A third example of the method optionally includes one or more of the first and second examples, and further includes wherein altering the NVH limits includes responsive to the occupant selected setting indicating a preference for fuel economy over NVH, setting a third NVH tolerance threshold, and adjusting one or more operating parameters of the vehicle based on the third NVH threshold, the third NVH threshold greater than second lower threshold and less than the first higher threshold. A fourth example of the method optionally includes one or more of the first through third examples, and further includes wherein adjusting one or more operating parameters of the vehicle based on the higher NVH threshold includes increasing one or more of a desired EGR amount, an operating range of VDE, a number deactivated cylinders during VDE mode, and an operating range of DFSO operation. A fifth example of the method optionally includes one or more of the first through fourth examples, and further includes wherein the powertrain includes an engine coupled to a transmission through a torque converter and adjusting one or more operating parameters of the vehicle based on the higher NVH threshold includes one or more of decreasing a percentage of torque converter slip, and adjusting a transmission shift schedule to upshift early and reduce a number of downshifts.

As another embodiment, a vehicle system includes a variable displacement engine (VDE) including a plurality of cylinders, where one or more of the cylinders are deactivated in a variable displacement mode of engine operation, the engine being coupled to a transmission through a torque converter; an occupant sensing system for detecting presence of an occupant within the vehicle, the occupant sensing system including one or more seat pressure sensors coupled to each vehicle seat; one or more autonomous driving sensors; an in-vehicle computing system including an autonomous driving module, the autonomous driving module including instructions for operating the vehicle in an autonomous mode based on signals received from the one or more autonomous driving sensors; and a processor and a storage device, the storage device storing instructions executable by the processor to detect a number of occupants within the vehicle; during a first condition including when one or more occupants are detected within the vehicle, adjusting one or more vehicle operating parameters based on a lower noise, vibration, and harshness (NVH) threshold of the vehicle; and during a second condition including when zero occupants are detected within the vehicle, adjusting one or more vehicle operating parameters based on a higher NVH threshold of the vehicle for increasing fuel economy improvement while compromising NVH; wherein the one or more vehicle operating parameters include a desire exhaust gas recirculation amount, a first engine speed and load range for variable displacement operation, a number of cylinders deactivated during the variable displacement mode, a second engine speed and load range for deceleration fuel shut off (DFSO) operation, torque converter slip, and a transmission shift schedule. A first example of the system includes wherein adjusting one or more vehicle operating parameters based on the higher NVH threshold includes increasing the desired EGR amount, increasing the first speed and load range for variable displacement operation, increasing the number of cylinders deactivated during the variable displacement mode, increasing the second engine speed and load range for DFSO operation, and decreasing torque converter slip. A second example of the method optionally includes the first example and further includes wherein adjusting one or more vehicle operating parameters based on the lower NVH threshold includes decreasing the desired EGR amount, reducing the first speed and load range for variable displacement operation, reducing the number of cylinders deactivated during the variable displacement mode, reducing the second engine speed and load range for DFSO operation, and decreasing torque converter slip.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle, comprising:
during an autonomous mode of vehicle operation, altering noise, vibration, and harshness (NVH) limits from a lower NVH threshold to a higher NVH threshold for a powertrain of the vehicle responsive to detecting zero occupants within the vehicle to improve fuel economy, and
adjusting a desired torque converter slip based on the higher NVH threshold, wherein the desired torque converter slip decreases as the NVH threshold increases.

2. The method of claim 1, wherein altering the NVH limits responsive to detecting zero occupants includes setting the higher NVH threshold with respect to the lower NVH threshold when one or more occupants are present in the vehicle, and adjusting one or more parameters of powertrain operation based on the higher NVH threshold.

3. The method of claim 2, wherein the powertrain includes an engine coupled to a transmission through a torque converter and adjusting the one or more parameters of the powertrain operation based on the higher NVH threshold includes adjusting one or more of an idle operation of the engine, a variable displacement engine (VDE) mode of engine operation, shut off fuel supplied to the engine during deceleration (DFSO) operation, and an exhaust gas recirculation percentage of recirculated exhaust gas and air inducted into the engine for combustion.

4. The method of claim 3, wherein adjusting the one or more parameters of the powertrain operation based on the higher NVH threshold further includes switching to the VDE mode of engine operation during an idle condition, and increasing an amount of spark retard applied to engine combustion during the idle condition.

5. The method of claim 3, wherein adjusting the one or more parameters of the powertrain operation based on the higher NVH threshold further includes, during the VDE mode of engine operation, deactivating a number of cylinders of the engine based on the higher NVH threshold, the number of cylinders deactivated increasing with an increase in the NVH threshold.

6. The method of claim 1, further comprising adjusting the NVH limits during lugging conditions of an engine.

7. The method of claim 6, wherein adjusting the NVH limits during the lugging conditions includes decreasing torque converter slip during the lugging conditions, a percentage of decrease in the torque converter slip increasing with an increase in the NVH limits.

8. The method of claim 2, wherein adjusting the one or more parameters of the powertrain operation based on the higher NVH threshold includes, responsive to a deceleration greater than a threshold, transitioning immediately to a deceleration fuel shut off (DFSO) operation during which fuel supplied to an engine of the powertrain for combustion is shut off, where the threshold is based on the higher NVH threshold.

9. The method of claim 1, wherein adjusting one or more parameters of powertrain operation based on the higher NVH threshold includes delaying exit from a deceleration fuel shut off (DFSO) operation where fuel supplied to an engine of the powertrain is shut off; and wherein delaying exit from the DFSO operation includes decreasing a vehicle speed threshold below which deactivated fuel injectors are reactivated.

10. A method for operating a vehicle, comprising:
setting different noise, vibration, and harshness (NVH) limits for a vehicle powertrain to one of a first NVH tolerance threshold, a second NVH tolerance threshold, and a third NVH tolerance threshold based on one or more of a number of occupants detected within the vehicle and an occupant-selected setting selected by an occupant through a vehicle interface, the third NVH tolerance threshold being higher than the second NVH tolerance threshold and lower than the first NVH tolerance threshold.

11. The method of claim 10, wherein setting the NVH limits includes, responsive to detecting zero occupants, setting the first NVH tolerance threshold, and adjusting one or more operating parameters of the vehicle based on the first NVH tolerance threshold.

12. The method of claim 11, wherein setting the NVH limits includes, responsive to detecting one or more occupants, setting the second, NVH tolerance threshold, and adjusting the one or more operating parameters of the vehicle based on the second NVH tolerance threshold, the first NVH tolerance threshold higher than the second NVH tolerance threshold.

13. The method of claim 11, wherein setting the NVH limits includes, responsive to the occupant-selected setting, indicating a preference for fuel economy over NVH, setting the third NVH tolerance threshold, and adjusting the one or more operating parameters of the vehicle based on the third NVH tolerance threshold.

14. The method of claim 11, wherein adjusting the one or more operating parameters of the vehicle based on the first NVH tolerance threshold includes increasing one or more of a desired EGR amount, an operating range of VDE, a number deactivated cylinders during VDE mode, and an operating range of DFSO operation.

15. The method of claim 11, wherein the vehicle powertrain includes an engine coupled to a transmission through a torque converter and adjusting the one or more operating parameters of the vehicle based on the first NVH tolerance threshold includes one or more of decreasing a percentage of torque converter slip, and adjusting a transmission shift schedule to upshift early and reduce a number of downshifts.

16. A vehicle system, comprising:
a variable displacement engine (VDE) including a plurality of cylinders, where one or more of the cylinders are deactivated in a variable displacement mode of engine operation, the VDE being coupled to a transmission through a torque converter;
an occupant sensing system for detecting presence of an occupant within a vehicle, the occupant sensing system including one or more seat pressure sensors coupled to each vehicle seat;
one or more autonomous driving sensors; and
an in-vehicle computing system including an autonomous driving module, the autonomous driving module including instructions for operating the vehicle in an autonomous mode based on signals received from the one or more autonomous driving sensors; and a processor and a storage device, the storage device storing instructions executable by the processor to:
detect a number of occupants within the vehicle;
during a first condition, including when one or more occupants are detected within the vehicle, adjusting one or more vehicle operating parameters based on a lower noise, vibration, and harshness (NVH) threshold of the vehicle;
during a second condition, including when zero occupants are detected within the vehicle, adjusting one or more vehicle operating parameters based on a higher NVH threshold of the vehicle for increasing fuel economy improvement while compromising NVH; and
during an engine lugging condition, decreasing a torque converter slip based on the higher NVH threshold of the vehicle;
wherein the one or more vehicle operating parameters include a desired amount of exhaust gas recirculated into the engine (EGR), a first engine speed and load range for the variable displacement mode of engine operation, a number of cylinders deactivated during the variable displacement mode of engine operation, a second engine speed and load range for shut off of fuel supplied to the VDE during deceleration (DFSO) operation, the torque converter slip, and a transmission shift schedule.

17. The system of claim 16, wherein adjusting the one or more vehicle operating parameters based on the higher NVH threshold of the vehicle includes increasing the desired EGR amount, increasing the first engine speed and load range for the variable displacement mode of engine operation, increasing the number of cylinders deactivated during the variable displacement mode of engine operation, increasing the second engine speed and load range for DFSO operation, and decreasing the torque converter slip.

18. The system of claim 16, wherein adjusting the one or more vehicle operating parameters based on the lower NVH threshold of the vehicle includes decreasing the desired EGR amount, reducing the first engine speed and load range for the variable displacement mode of engine operation, reducing the number of cylinders deactivated during the variable displacement mode of engine operation, reducing the second engine speed and load range for DFSO operation, and decreasing the torque converter slip.

\* \* \* \* \*